(12) United States Patent
Morcom

(10) Patent No.: US 10,908,266 B2
(45) Date of Patent: Feb. 2, 2021

(54) TIME OF FLIGHT DISTANCE SENSOR

(71) Applicant: Photonic Vision Limited, Sevenoaks Kent (GB)

(72) Inventor: Christopher John Morcom, Westbere (GB)

(73) Assignee: PHOTONIC VISION LIMITED, Sevenoaks (GB)

(*) Notice: Subject to any disclaimer, the term of this patent is extended or adjusted under 35 U.S.C. 154(b) by 400 days.

(21) Appl. No.: 15/760,115

(22) PCT Filed: Sep. 15, 2016

(86) PCT No.: PCT/EP2016/071822
§ 371 (c)(1),
(2) Date: Mar. 14, 2018

(87) PCT Pub. No.: WO2017/050633
PCT Pub. Date: Mar. 30, 2017

(65) Prior Publication Data
US 2018/0252800 A1    Sep. 6, 2018

(30) Foreign Application Priority Data
Sep. 21, 2015   (GB) .................................. 1516701.8

(51) Int. Cl.
*G01S 7/4863*   (2020.01)
*G01S 17/42*    (2006.01)
(Continued)

(52) U.S. Cl.
CPC ............ *G01S 7/4863* (2013.01); *G01S 17/10* (2013.01); *G01S 17/42* (2013.01); *G01S 17/89* (2013.01)

(58) Field of Classification Search
CPC ........ G01S 17/89; G01S 17/10; G01S 7/4863; G01S 17/42; G01S 17/58; G01S 17/894;
(Continued)

(56) References Cited

U.S. PATENT DOCUMENTS

| 4,656,518 A | * | 4/1987 | Kosonocky | .......... | H04N 5/3452 |
| | | | | | 348/320 |
| 5,134,087 A | * | 7/1992 | Hynecek | ................ | G11C 27/04 |
| | | | | | 257/E27.154 |

(Continued)

FOREIGN PATENT DOCUMENTS

| DE | 10 2012 109129 A1 | 5/2013 |
| EP | 1152261 A1 | 11/2001 |

(Continued)

OTHER PUBLICATIONS

Fellers "Electron Multiplying Charge-Coupled Devices (EMCCDs)" (Year: 2014).*

(Continued)

*Primary Examiner* — Isam A Alsomiri
*Assistant Examiner* — Amir J Askarian
(74) *Attorney, Agent, or Firm* — Thomas Coester Intellectual Property

(57) ABSTRACT

A time of flight sensor has a photosensitive image region (1) comprising a linear array of M pixels; a storage region (2) comprising M columns of N storage elements, and transfer circuitry to transfer data along the M columns of storage from an input storage element connected to a respective one of the M pixels along column of N storage elements to an output storage element at a transfer frequency Ft, each row of M storage elements storing data captured at the same time; and a readout section (3) arranged to read out data from the output end of the M columns of the storage region at a readout frequency Fr. In this way the readout frequency (Continued)

and transfer frequency may be separately controlled. An amplifier (4) may be connected to the readout section. An optical shield (5) may shield the storage elements leaving the photosensitive image region unshielded. The elements may be elements of a charge coupled array.

20 Claims, 14 Drawing Sheets

(51) Int. Cl.
*G01S 17/89* (2020.01)
*G01S 17/10* (2020.01)

(58) Field of Classification Search
CPC ........ G01S 7/4813; G01S 17/32; G01S 17/86; G01S 17/87; G01S 17/88; G01S 17/931; G01S 17/933; G01S 3/7867; G01S 7/003; G01S 7/4811; G01S 7/4814; G01S 7/4816; G01S 7/4817; G01S 7/4861; G01S 7/4912; G01S 7/493; G01C 3/08; G01P 5/244; G01P 5/26; G01R 23/02; H01S 5/0428; H01S 5/06216; H04N 17/002; H04N 3/1525; H04N 3/1575; H04N 5/37213; H04N 5/3725
See application file for complete search history.

(56) References Cited

U.S. PATENT DOCUMENTS

| | | | |
|---|---|---|---|
| 5,453,834 A | 9/1995 | Evenstad | |
| 6,753,950 B2 | 6/2004 | Morcom | |
| 7,515,082 B2* | 4/2009 | Hillis | H04N 5/2355 341/155 |
| 7,969,558 B2 | 6/2011 | Hall | |
| 8,054,363 B2* | 11/2011 | Robbins | H04N 3/1525 348/311 |
| 9,142,591 B2* | 9/2015 | Ito | H01L 27/14831 |
| 9,557,856 B2* | 1/2017 | Send | G01S 17/66 |
| 9,609,247 B2* | 3/2017 | Suzuki | H01L 27/14609 |
| 2006/0163474 A1* | 7/2006 | Denvir | G11C 19/285 250/305 |
| 2006/0192938 A1* | 8/2006 | Kawahito | H01L 31/101 356/5.03 |
| 2007/0214200 A1* | 9/2007 | Hazelwood | H01L 27/1485 708/200 |
| 2008/0180791 A1* | 7/2008 | Schreiber | G02B 21/008 359/363 |
| 2012/0044476 A1* | 2/2012 | Earhart | G01S 17/86 356/4.01 |
| 2012/0154535 A1* | 6/2012 | Yahav | G01S 17/89 348/46 |
| 2013/0140433 A1* | 6/2013 | Oggier | G01S 17/894 250/208.1 |
| 2015/0028213 A1* | 1/2015 | Weinberg | G01C 3/08 250/340 |
| 2015/0187923 A1* | 7/2015 | Kawahito | H01L 27/1461 257/223 |
| 2016/0041266 A1* | 2/2016 | Smits | G01S 7/497 356/5.01 |
| 2019/0018119 A1* | 1/2019 | Laifenfeld | G01S 17/10 |

FOREIGN PATENT DOCUMENTS

| | | |
|---|---|---|
| EP | 2378310 A1 | 10/2011 |
| JP | 2011/171913 A | 9/2011 |
| WO | 2008/142968 A1 | 11/2008 |

OTHER PUBLICATIONS

R. Miyagawa and T. Kanade, "CCD-Based Range-Finding Sensor," IEEE Transactions on Electron Devices, vol. 44, No. 10, Oct. 1997.
R. Langea, P. Seitza, A. Bibera and R. Schwarteb, "Time-of-flight range imaging with a custom solid-state image sensor," in Laser Metrology and Inspection, Proc. SPIE, vol. 3823, Munich, 1999.
S. Burak Gokturk, H. Yalcin and C. Bamji, "A Time-Of-Flight Depth Sensor—System Description, Issues and Solutions," in Computer Vision and Pattern Recognition Workshop, 2004.
T. Sawada, S. Kawahito, M. Nakayama, K. Ito, I. A. Halin, M. Homma, T. Ushinaga and Y. Maeda, "A TOF range image sensor with an ambient light charge drain and small duty-cycle light pulse," in Proc, 2007 International Image Sensor Workshop, Ogunquit Maine, USA, 2007.
C. L. Niclass, "Single-Photon Image Sensors in CMOS : Picosecond Resolution for Three-Dimensional Imaging," École Polytechnique Fédérale de Lausanne, Lausanne, 2008.
B. De Monte and R. Bell, "Development of an EMCCD for LIDAR applications," International Conference on Space Optics ICSO, 2010.
A. Kilpelä, R. Pennala and J. Kostamovaara, "Precise pulsed timeof-flight laser range finder for industrial distance measurements," Review of Scientific Instruments, vol. 72(4), pp. 2197-2202, Apr. 2001.
S. Kurtti and J. Kostamovaara, "CMOS receiver for a pulsed TOF laser rangefinder utilizing the time domain walk compensation scheme," in 20th IMEKO TC4 International Symposium and 18th International Workshop on ADC Modelling and Testing, Benevento, 2014.
G. Hopkinson and D. Lumb, "Noise reduction techniques for CCD image sensors," J. Phys. E: Sci. Instrumm., vol. 15, 1982, pp. 1214-1222, 1982.
K. D. Stefanov and N. J. Murray, "Optimal digital correlated double sampling for CCD signals," Electronics Letters, 50(14), p. 1022-1024, 2014.
M.-C. Amann, T. Bosch, M. Lescure, R. Myllyla and M. Rioux, "Laser ranging: a critical review of usual techniques for distance measurement," Opt. Eng. 40(1) , p. 10-19, Jan. 2001.
S. K. Madan, B. Bhaumik and J. M. Vasi, "Experimental observation of avalanche multiplication in charge coupled devices," IEEE Trans. Electron Devices, vol. ED-30, pp. 694-699, Jun. 1983.
Osram Semiconductors, "Range Finding Using Pulse Lasers," Osram Semiconductors, 2004.
Chrzanowski K Ed—Skarbek Wlad—"Review of night vision technology", Opto-Electronics Review, Warszawa, PL, vol. 21, No. 2, Mar. 15, 2013.
Velodyne Lidar, "HDL-64E," Data Sheet 2016.

\* cited by examiner

TIME OF FLIGHT DISTANCE SENSOR

FIELD OF INVENTION

The invention relates to a time of flight distance sensor and method of use.

BACKGROUND TO THE INVENTION

Accurate and fast surface profile measurement is a fundamental requirement for many applications including industrial metrology, machine guarding and safety systems and automotive driver assistance and collision warning systems.

Whilst sensors based on triangulation measurement techniques using structured illumination patterns have proven to be very successful in short range applications such as gesture control, gaming and industrial metrology their inability to cope with high ambient light levels have tended to restrict their use to indoor applications or applications where the overall illumination can be controlled.

To overcome these constraints, much effort has been expended on developing pixelated focal plane arrays able to measure the time of flight of modulated or pulsed infra-red (IR) light signals and hence measure the 2D and 3D profile of remote objects.

It was recognised many years ago that the ability of charge coupled device (CCD) technology to collect and integrate photo-generated charge on chip noiselessly was beneficial to time of flight imaging and many workers have examined and developed the use of photodiodes with charge coupling transfer gates for time of flight measurement and light radar or lidar.

A common approach is to use CCD transfer gates to allow the synchronous or "lock-in" detection of the phase shift of a modulated illumination signal. In the simplest form of such devices, electrode structures within each pixel create a potential well that is shuffled back and forth between a photosensitive region and a covered region. By illuminating the scene with a modulated light source (either sine wave or square wave modulation has been used) and synchronising the shuffling process with the modulation, the amount of charge captured in each pixel's potential well is related to the phase shift and hence distance to the nearest surface in each pixel's field of view. As the shuffling process is essentially noiseless, many cycles of modulation can be employed to integrate the signal and increase the signal to noise ratio for a given signal power level. This basic approach with many refinements is the basis of the time of flight focal plane arrays manufactured by companies such as PMD, Canesta (Microsoft) and Mesa Imaging.

The key benefits of such approaches are that all the pixels in the array are able to measure the distance to a remote object in parallel and they can be manufactured using low cost complementary metal oxide semiconductor (CMOS) integrated circuit processes. However, such sensors do have some important limitations:
  a) Ambient light and thermal effects generate a background level of charge within the potential wells and the statistical fluctuations (shot noise) in this background charge introduce noise in the measured signal. In addition, the electronic circuitry necessary to amplify the photo-charge also introduces noise and the aggregate effect of these noise sources (typically around 25 to 50 rms electrons) constrains the maximum operating range that can be achieved for a given emitted optical power/field of view combination.
  b) When operated in high ambient light conditions, special charge draining measures must be taken to prevent saturation. However, whilst such measures prevent the loss of phase information under high ambient light conditions, shot noise on the background signal is still present and restricts the sensor's range.
  c) Each pixel is only able to provide a single measurement of range so the detection and discrimination of multiple returns at different distances within the field of view, as may be required in the presence of fog, is problematic.
  d) For a single measurement, the maximum range that can be measured is limited by the period of the modulation because if the time of flight is greater than the modulation period ambiguity is introduced. This effect can be mitigated by capturing multiple measurements with different modulation frequencies but this requires a sufficiently high signal to noise ratio to reliably decode the range and this demands higher optical powers. In addition, the ambiguity reduction algorithms have difficulty coping with moving objects whose speed is such that their position changes significantly between the different modulation frequency measurements.
  e) The space required by the phase detection circuitry at each pixel reduces the fill factor of the pixel: i.e. the ratio of photosensitive area to the total area of the pixel, to typically less than 25%, reducing sensitivity. In addition, the size of circuitry sets a lower limit on the absolute size of each pixel and hence the overall size of the sensor for a given number of pixels.

These limitations have tended to limit the application of such sensors to short range applications such as gesture control and gaming and have led to more exotic approaches being developed by companies such as Advanced Scientific Concepts Inc. whereby arrays of avalanche photodiodes (APD) are bump bonded to silicon readout integrated circuits (ROIC). The APDs provide gain prior to the readout circuitry thus reducing the effective noise level. This has allowed operating ranges of around 100 m to be achieved for a 30°×7.5° field of view. However, the difficulties and costs associated with manufacturing dense arrays of APDs has meant that the resolution of such sensors is limited (e.g. 256×32 pixels) and their prices are very high.

Other workers have developed systems using arrays of single photon avalanche detectors (SPAD) operated to detect the time of flight of individual photons. However, such systems are also costly and complex to manufacture.

Another approach that has been tried to overcome the noise disadvantage of standard CCD/CMOS sensors for Lidar applications is to use an electron multiplying CCD register to amplify the reflected signal prior to charge detection. Here the light collected by the Lidar system's optical receiver is focussed onto a photosensitive portion of a CCD that transfers the collected charge into an electron multiplying (EM) CCD register. By continually clocking the EMCCD register, the collected charge is amplified prior to being passed to the CCD output circuit, thus significantly reducing the contribution of the CCD output circuit noise. However, the high transfer and readout clock frequencies (many tens of MHz) necessary to achieve useful time resolution for industrial and automotive applications leads to higher readout noise levels. This requires operation at a high level of EM gain with a consequent reduction in the effective peak signal level and hence dynamic range of the device. This has restricted this technique to specialist applications such as atmospheric Lidar, where the temporal resolution requirements are less demanding and the returned signal amplitude is guaranteed to be low due to the low reflectivity of the atmosphere.

As a result, commercially successful medium and long range lidar sensors that are capable of operating outdoors and manufactured by companies such as SICK AG and Velodyne Lidar still use mechanically scanned laser rangefinders to provide linear (2D) and area (3D) coverage.

In these devices, a laser emits short pulses of light and a receiving lens and photodiode are used to capture the reflected optical signal from a remote object and convert it into an electrical signal. Pulse detection circuitry is used to detect the received pulse allowing the time of flight of the laser pulse to be calculated. From knowledge of the speed of light, the distance to the far object can then be derived. To allow the distance profile of far objects to be measured the laser beam and receiving lens/detector are scanned either by rotating the whole assembly or through a rotating mirror.

Such sensors are commonly used in industrial applications where the mechanical scanning allows the 2D distance profile of a single linear scan to be measured, which is often sufficient for machine guarding and simple autonomous vehicle control and safety systems. The long range versions of these Lidar systems use avalanche photodiodes to provide signal gain and reduce the effective noise level. In this case, mechanical scanning allows one APD to measure the surface profile over the scanned region, without needing a costly array of APDs. However, even single avalanche photodiodes are relatively costly and for long range operation high precision scan mechanics are needed. As a result, single line scanners capable of operating in daylight at distances of over 10 m still tend to be expensive, selling at prices of over $1000 each.

For autonomous vehicle applications, such as Google's driverless car, a single horizontal line scan provides insufficient spatial resolution and to overcome this, Velodyne Lidar have developed a product that uses a linear array of laser illuminators, transmitting and receiving lenses and an aligned array of individual APDs (up to 64) mounted in a housing that rotates continuously allowing 64 vertically spaced 360° horizontal line scans to be captured. Whilst the performance of such devices is very good, the need for 64 lasers, 64 APDS and 64 channels of processing circuitry make it a very costly device, selling at more than $50K per unit.

In summary, existing focal plane time of flight sensors can be low cost but are restricted in operational range due to their relatively high readout noise. Whilst the noise problem can be ameliorated using avalanche photodiodes, their higher cost and the need for additional electronics and/or mechanical scanning to provide 2D or 3D distance profile measurement increases cost.

Thus there is a need for a solution able to offer the low noise and extended operating range performance of APD based lidars but with the lower costs of the focal plane time of flight arrays.

SUMMARY OF THE INVENTION

According to a first aspect of the invention there is provided a time of flight sensor comprising:
a photosensitive image region comprising an array of P by M pixels, where P is 1 or a positive integer at least 2;
a storage region arranged not to respond to incident light, the storage region comprising M columns of N storage elements, arranged to transfer data along the M columns of storage from a respective one of the M pixels along column of N storage elements at a transfer frequency Ft, each row of M storage elements storing data captured at the same time;
a readout section arranged to read out data from the M columns of the storage region at a readout frequency Fr.

According to a second aspect of the invention, there is provided a time of flight distance measurement system, comprising:
a time of flight sensor as set out above;
a light emitter;
and
circuitry for controlling the time of flight sensor to capture image data in the image section and to transfer the captured image data along the columns at the transfer frequency Ft and then to readout the captured image data at a different readout frequency Fr.

By separating out the readout from the image capture and providing the storage region, it is possible to separate out the image capture and readout operations so that both can be separately controlled and hence separately optimised to reduce noise. Thus, the readout process may be carried out independently of the capture process.

The time of flight sensor and time of flight distance measurement system including the time of flight sensor allows the distance resolution, which is determined by the speed of capturing data which is in turn limited by the transfer frequency, to be set independently of the clock frequency used for data readout, the readout frequency. This has the significant benefit of allowing for a substantial reduction in noise for a particular distance resolution as will be set out in more detail below.

Preferably, the transfer frequency Ft is at least 10 MHz. This may be achieved to provide sufficient distance resolution even if the readout frequency is lower.

In embodiments, the system comprises a signal discriminator circuit arranged to process the data read out by the readout section. The captured data may be read out through the signal discriminator circuit to determine the time of flight of light emitted by the light emitter to a remote object and reflected back to the photosensitive image region during the capture process The system may further include a transmitter lens for transmitting light emitted by the light emitter and a receiving lens for receiving light emitted by the light emitter and transmitter lens and reflected by an object and illuminating the photosensitive image region of the time of flight sensor;

In embodiments, an electron multiplication register may deliver an electron multiplication gain G, the electron multiplication register being connected between the readout section and an output amplifier. Such an electron multiplier register may multiply the charge by the gain factor G before conversion to a voltage in the output amplifier thereby increasing the signal to noise ratio.

Further, there may be provided circuitry for adjusting the electron multiplication gain G dependent on the row of M storage elements being read out. Different rows correspond to different distances so in this way the gain may be adjusted depending on the distance to compensate for the much weaker signals obtained at longer distances.

Alternatively or additionally, there may be provided circuitry for adjusting the read out time dependent on the row of M storage elements being read out. This can increase the readout time to reduce the signal to noise ratio differently for different rows and hence again adapt the readout for the different signal amplitudes expected at different distances corresponding to different rows.

In one arrangement, the readout section may be arranged to read out the row of storage elements serially.

In another arrangement, the readout section may be arranged to read out data of a row of storage elements in parallel. In particular, data of a complete row of storage elements may be read out in parallel or alternatively sections of a row of storage elements may be read out in parallel.

In order to combine parallel readout with electron multiplication, electron multiplication register sections may be inserted in each of the parallel readout sections to deliver an electron multiplication gain G to the pixels of each row of M storage elements in parallel.

The time of flight sensor may also include an anti-blooming electrode gate separating the M elements of the image section from a drain structure.

This may be driven by circuitry arranged to reduce the anti-blooming voltage applied to the anti-blooming gate electrode in synchronism with the transfer of data along the columns of the storage region. Using such an approach, the operation of the sensor can be optimised by controlling the anti-blooming potential during the frame transfer period so as to match the dynamic range of the readout process with the expected signal level and prevent saturation.

An additional feature is that circuitry may be arranged to supply a range gating voltage followed by a higher anti-blooming voltage to the anti-blooming electron gate, the range gating voltage being a low voltage such that the potential barrier between the image section elements and the drain structure is removed to clear charges from the image section, and the higher anti-blooming voltage being a voltage applied during capture of the image. In this way, the image section may be cleared to the drain before capturing image data.

An optical shield may shield the storage region and leaving the photosensitive image region exposed. In this way, the elements of storage region and image region may have the same structure, the image region being constituted by the unshielded elements.

The photosensitive image region and the storage section may thus comprise elements of an M by (N+1) array of charge coupled elements, the optical shield shielding all but one row of M charge coupled elements, the said one row constituting the photosensitive image region and the N rows of the charge coupled elements constituting the storage region.

The time of flight sensor may also include an additional store section for integrating light captured from multiple pulses, the additional store section comprising at least one additional storage element connected to each of the M elements of the image section. The additional store section may be used to store data from one light pulse and add it to data captured from other light pulses to increase the signal before processing.

The time of flight distance measurement system may include a time of flight sensor with a photosensitive image region having an array of P rows of M pixels.

The time of flight system may also include a steering element for transmitting light from the transmitter lens in a plurality of different directions or control circuitry driving multiple light emitters and a lens system arranged such that the light emitted in the plurality of different directions is captured on a respective subsection comprising one or more of the P rows of M pixels.

Thus, in a particularly preferred arrangement the photosensitive image region comprises an array of P rows of M pixels, where P is at least 2; and the time of flight distance measurement system further comprises a steering element

(51) for transmitting light from the transmitter lens in a plurality of different directions or a control circuitry driving multiple light emitters and a lens system arranged such that the light emitted in the plurality of different directions is captured on a respective one of the P rows of M pixels or a defined sub-set of the P rows of M pixels.

In another aspect of the invention, there is provided a method of operating a time of flight sensor as discussed above, the method including:
- capturing an image on the pixels of the photosensitive image region;
- repeatedly and synchronously transferring the image on the M pixels of the photosensitive image region along the M columns of the storage region at the transfer frequency Ft and capturing a new image on the M pixels of the photosensitive image region at the transfer frequency Ft; and
- reading out the captured pixels of the storage region through the readout section at the readout frequency Fr.

BRIEF DESCRIPTION OF THE DRAWINGS

Embodiments of the invention will now be described with reference to the accompanying diagrams, in which.

DETAILED DESCRIPTION

Figure 1:
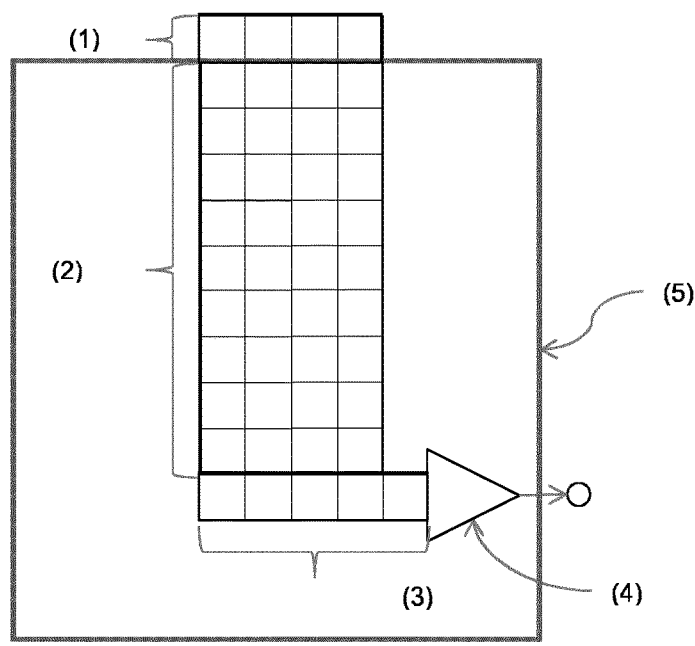
FIG. 1 shows an example of a four pixel linear array time of flight sensor.

With reference to FIG. 1, the pixelated linear array time of flight sensor is constructed using a photosensitive image region (1) comprising a linear array of M photosensitive picture elements (pixels), typically photodiodes or light sensitive CCD picture elements; a store section (2) analogue delay lines where the input of each delay line is connected to a corresponding photosensitive pixel and each delay line comprises N elements; a readout section comprising a further register (3) arranged to collect the outputs of the store section delay lines in parallel manner and transfer this data in serial fashion to an output amplifier (4) and an opaque optical shield (5) that covers the store/readout sections and output amplifier. All these sections would typically be designed and manufactured as a monolithic integrated circuit using standard CCD, CMOS or CCD/CMOS manufacturing technology.

Note that the quantum efficiency of such a sensor may be improved by "back thinning", in which the sensor is manufactured with components on the front of a substrate and then the substrate is "back-thinned", i.e. thinned on the back. The sensor can then be used with illumination from the rear, i.e. passing through the substrate. This avoids any absorption in the electrodes and hence can increase efficiency.

The CCD elements accordingly form a row of M pixels in the photosensitive image region (1) and a storage array of M columns of N storage elements in the storage region (2). These elements are all like elements of the CCD array and the different functions correspond to the location—the elements that are exposed by the optical shield capture incident light and the remaining elements are used as storage.

The charge stored in a pixel in the image region (1) is transferred along the respective column of storage elements (2) by circuitry (not shown) integrated in the storage elements. This circuitry is integrated in the CCD, CMOS or CCD/CMOS storage elements to achieve transfer along a row or column of storage elements. Such circuitry is known and will not be described further. The speed of transfer may be controlled for example by circuitry (16, FIG. 2) which can control the speed of the clock signals applied to the time of flight sensor.

In the embodiment illustrated in FIG. 1, transfer circuitry is arranged to cause transfer of charge only in one direction, downwards along the columns from the image region (1), but in other embodiments the transfer circuitry may transfer charge in both directions along the columns as will be described below.

It should be noted that a number of alternative approaches could be taken to implementing the storage sections and delay lines including but not limited to CCD and/or CMOS switched capacitor technologies.

Figure 2:
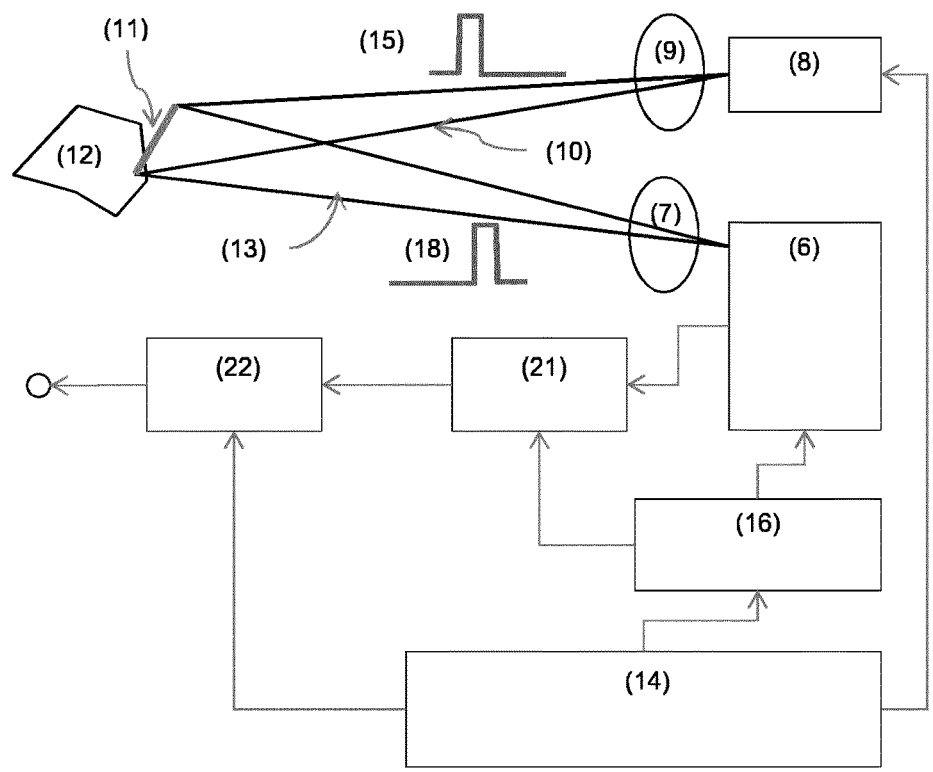
FIG. 2 is a block diagram of a time of flight distance measurement system using the sensor shown in FIG. 1.
Figure 3:
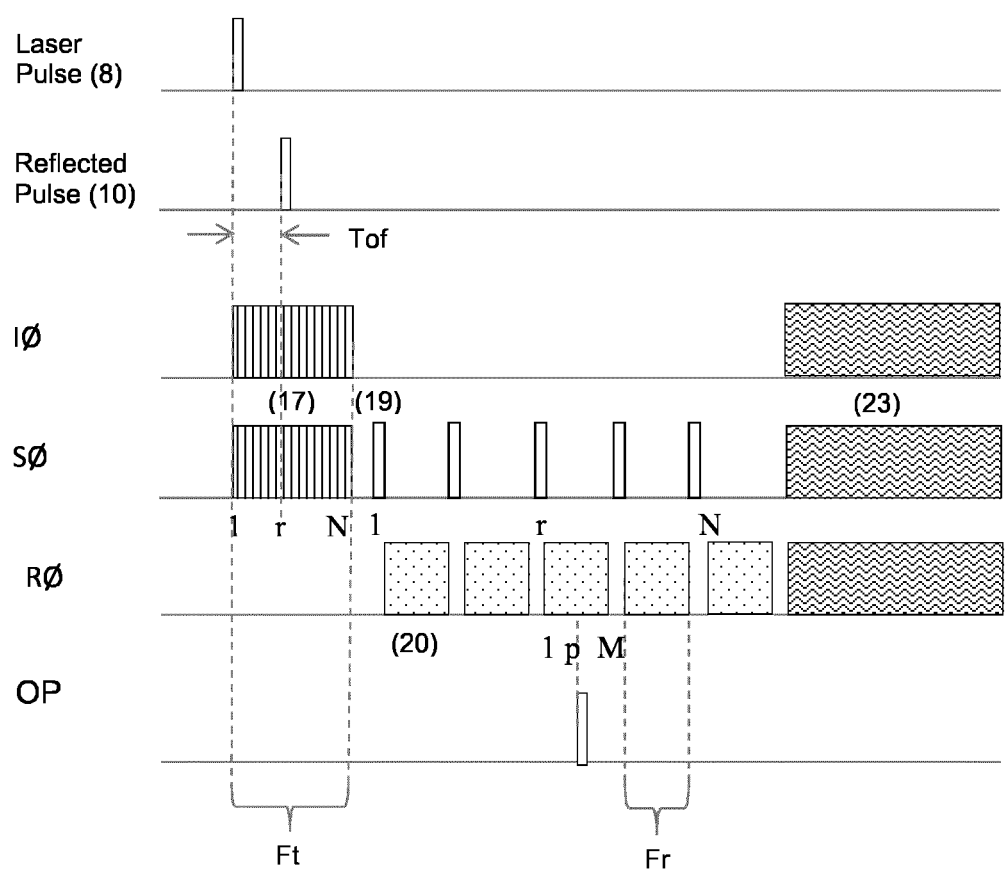
FIG. 3 is a timing diagram showing the operating method of the sensor.

In the typical application described with reference to FIGS. 2 and 3, the time of flight sensor (6) is combined with a receiving lens system (7), light emitter (8) and transmitter lens system (9) to form a time of flight distance measurement system. The light emitter is typically formed of one or more laser diodes but could equally be fabricated from light emitting diodes, solid state lasers or other high intensity light sources. The transmitter lens system (9) is configured to form the light emitted from the laser (8) into a "fan shaped beam" (10) to create a stripe of illumination (11) across the far object (12). The receive lens system is arranged to focus the light reflected from the illuminated stripe (11) onto the image section (1) of the time of flight sensor (6). For optimum efficiency, the field of view (13) of the time of flight sensor image section (1) is accurately aligned with the illuminated stripe at the remote object. To optimise signal to noise ratio, it is advantageous for the receive lens system to incorporate a narrow band filter that transmits the wavelength range of the light emitter but rejects other wavelengths.

In operation, control circuitry (14) causes the emitter (8) to emit a short pulse of light (15) and commands the time of flight sensor drive circuit (16) to generate N synchronised image and store clock sequences (17) at a frequency Ft. These clock sequences cause photo-generated charge within any of the M pixels to be sequentially transferred from that pixel into the corresponding delay line within the store section (2) of the time of flight Sensor.

If a reflected pulse (18) arrives at picture element p of the time of flight sensor image section after a time delay of time of flight, it will generate a charge packet within that picture element that will be transferred into the corresponding store section r clock cycles after the start of the transfer clock, where:

$r$=Time of flight*$Ft$.

After N clock cycles, the image and store section clocks are stopped and the control circuit (14) causes the drive circuit (16) to generate a store clock sequence (19) that transfers a single row of M charge packets from the store section to the readout section in parallel.

After each row transfer clock cycle, the readout section is clocked (20) to sequentially transfer each of the M pixels within the row to the output amplifier (3) at a frequency Fr. The charge packets are detected and then processed and amplified by signal processing circuit (21) whose output is passed to a signal discriminator (typically a pulse detector) and computation circuit (22). This process is repeated until all the sensor rows have been read out.

A charge packet generated by the reflected light pulse from the far object in pixel p will give rise to a pulse in the signal from the time of flight Sensor (6)/processing circuitry (21) that is detected by the pulse detector (22) after r row transfer cycles and p pixel transfer clock cycles.

From knowledge of the fast transfer frequency Ft and the speed of light (c), the computation unit calculates the distance to the region of the far target imaged by pixel D(p) as:

$$D(p) = \frac{r}{(2*Ft)} \cdot c \qquad \text{Equation 1}$$

In this way, the distance profile of the far object (12) along the illuminated stripe (11) is measured with M sample points.

After readout of the time of flight sensor has been completed the control circuit (14) causes the drive circuit (16) to set the image, store and readout section clocks to a charge clearing state (23) to ensure that the registers are clear for the start of the next measurement.

For existing time of flight lidar and rangefinder architectures, including a CCD based sensor architecture, the basic temporal resolution of the sensor is determined by the CCD readout frequency. For typical industrial and automotive applications this needs to be high (for example, to provide a basic measurement precision of 1 m requires a readout frequency of 150 MHz) and for successful operation the photodetector and associated readout and detection circuitry need to have a commensurately wide bandwidth (typically equal to the reciprocal of the pulse width of the emitted optical pulse). Unfortunately, this means that the noise bandwidth is also wide leading to a high level of noise, limiting the signal to noise ratio and hence maximum operating range for a given emitted optical power.

In contrast, the time of flight sensor architecture and operating method described above allows the clock frequency for the transfer process, the transfer frequency Ft that determines the distance resolution to be set independently of the clock frequency used for the data readout, the readout frequency Fr. This has the significant benefit of allowing a lower frequency to be used for data readout with an associated reduction in noise. The transfer frequency Ft corresponds with the frequency of data acquisition since data is acquired into the array at the same rate it is transferred across the columns of the storage elements. For example, the data acquisition frequency Ft could be set at 150 MHz to yield 1 m distance resolution, but the data readout frequency Fr could be set at 150 KHz. This 1000:1 reduction in readout frequency would reduce system noise by a factor of √1000 (i.e. ~33) whilst maintaining the same distance resolution of 1 m. This reduction in noise level would allow either the maximum operating range to be increased for the same laser peak power or the same range to be achieved with a thirtieth of the laser peak power, thus reducing the cost and size of the sensor.

It will be seen that the temporal sampling resolution is set by the maximum parallel transfer rate (Ft) that can be achieved in the image and store sections. For CCD based sensors, the electrical resistance and capacitance distributed across the COD's polysilicon electrodes act as a low pass filter reducing the amplitude and slowing the edges of the drive pulse waveforms as they propagate from the edge to the centre of the device. These effects set a limit on the maximum clock frequency that can be employed, but can be minimised by using electrical straps manufactured from aluminium or another low resistivity substances to reduce the effective time constant of the electrode structures allowing a higher clock frequency to be used and allowing higher distance resolution to be achieved.

One approach to providing an electrical strap is to place a low resistivity material along the length of each polysilicon electrode. Another is to use electrical straps that run from low resistance clock signal bus bars along the top of the device to the polysilicon electrodes in an orthogonal direction to contacts made periodically along the polysilicon electrodes. In this case, the orthogonal low resistance electrical straps may be positioned over the anti-blooming structures to minimise their effect on the fill factor of the sensor. It will be understood by those skilled in the art that other approaches are possible.

If the image (1) and store (2) sections are both manufactured using CCD elements, further very significant advantages can be realised over existing time of flight sensors as will be explained below:
a) Other time of flight rangefinder sensors such as described in US patent US2015/0028213 also seek to use different time of flight signal capture (Ft) and readout (Fr) frequencies, However, to operate successfully at low signal levels an amplifier is needed between each photo-detector and the rest of the sensor circuitry. As this amplifier needs to operate with a wide bandwidth (of the order of Ft or more) to avoid distorting the time of flight signal it will introduce significant noise. In contrast if the image (1) and store (2) sections are manufactured using CCD elements, the capture of photo-generated charge at frequency Ft and the transfer of this charge to the readout register (3)/output circuit (4) is essentially noiseless and eliminates the need for a wide bandwidth amplifier circuit and its associated noise.
b) Other workers have sought to integrate CCD delay lines into focal plane arrays to allow high speed signal capture followed by lower speed readout (e.g. JP2011/171913 and WO2008/142968). However, in contrast to the sensor architecture described here, the physical space taken up by the delay lines restricts the size of the photosensitive region that can be accommodated for each pixel. As a result the fill factor (ratio of photosensitive area to total pixel area) and hence the basic photo-electric sensitivity of these sensors is much reduced. In contrast, by manufacturing the image (1) and store (2) sections using CCD elements, each pixel is both a photo-electric sensor and delay line element meaning that the fill factor can be 100%, yielding a very significant sensitivity advantage over prior approaches whilst still allowing high speed signal acquisition.

The combination of these two factors mean that the sensor architecture described here offers both lower noise and higher sensitivity than the prior art, delivering significant performance and cost benefits.

Note that the time of flight sensor can also be switched into a mode in which it operates as a normal linear array image sensor capturing an image of the scene by turning off the laser. Without the laser, the photosensitive image sensor captures the image. This may result in a reduction of the light intensity which can be compensated for by incorporating a signal integration period prior to the frame transfer. In this way, the captured signal level is proportional to the light reflected from the scene and once readout in the normal way provides image intensity information. The signal integration period may be timed to overlap the readout period of a previous distance measurement to maximise the overall readout rate.

Improvements in Readout Method

For a laser rangefinder operated with a far object that fully intersects the laser beam, the signal power $P_R$ incident upon the detector is given by:

$$P_R = T_T T_R \frac{\rho_d}{\pi} P_0 \cos\theta \frac{A_R}{D^2} \qquad \text{Equation 2}$$

Where:
$P_0$=power output of the laser
$T_T$=collection and transmission efficiency of transmitter
$T_R$=transmission of the receiver optics
$\rho_d$=Lambertian reflection coefficient of the target
$\Theta$=laser beam incident angle on the target
$A_R$=area of receiver lens
D=distance to the far object Under these circumstances it can be seen that signal power declines with far object distance at a rate of distance squared. For far objects that are smaller than the laser beam, the signal power declines with the fourth power of distance.

These strong functions of signal power with distance mean that lidars intended to operate at medium and long ranges are required to cope with a very wide dynamic range signal level: falling from high signal levels for close objects to very low signal levels for far away objects.

However, a key benefit of decoupling the time of flight pulse capture from the pulse readout and detection process as allowed by the new time of flight sensor architecture is that the readout and detection process can be optimised in a manner which is not possible with existing sensors. Improvements that may be used separately or together are described in the following sections. The approaches are described with reference to a CCD based sensor but may also be applied to other readout architectures.

Alternatively or additionally, to improve the precision of distance measurement, a number of measurements are taken with the relative time between the pulsed illumination and the CCD readout incremented in time steps that are a known fraction of the CCD image/store section transfer clock period.

For example, three measurements could be taken with the laser pulse start time successively delayed by one third of the CCD clock period. In this way the reflected illumination pulse can be oversampled by a factor of three to provide an improvement in range precision and accuracy.

Thus, in this embodiment, to oversample the reflected illumination pulse by a factor of K, the control circuitry (14) is adapted to cause the time of flight sensor to capture K measurements by emitting a laser pulse from the light emitter and capturing the time of flight image at the photosensitive image sensor with a delay time, wherein the delay time ($\Delta T_i$) between emitting the laser pulse and starting the high speed transfer clock of frequency $F_t$ to capture the time of flight image data is set by the following equation:

$$\Delta T_i = \frac{i}{F_t K}$$

Where i is incremented by one from 0 to K−1 between each high speed transfer/slow speed readout time of flight measurement cycle.

Variable Electronic Multiplication Gain

Figure 4:
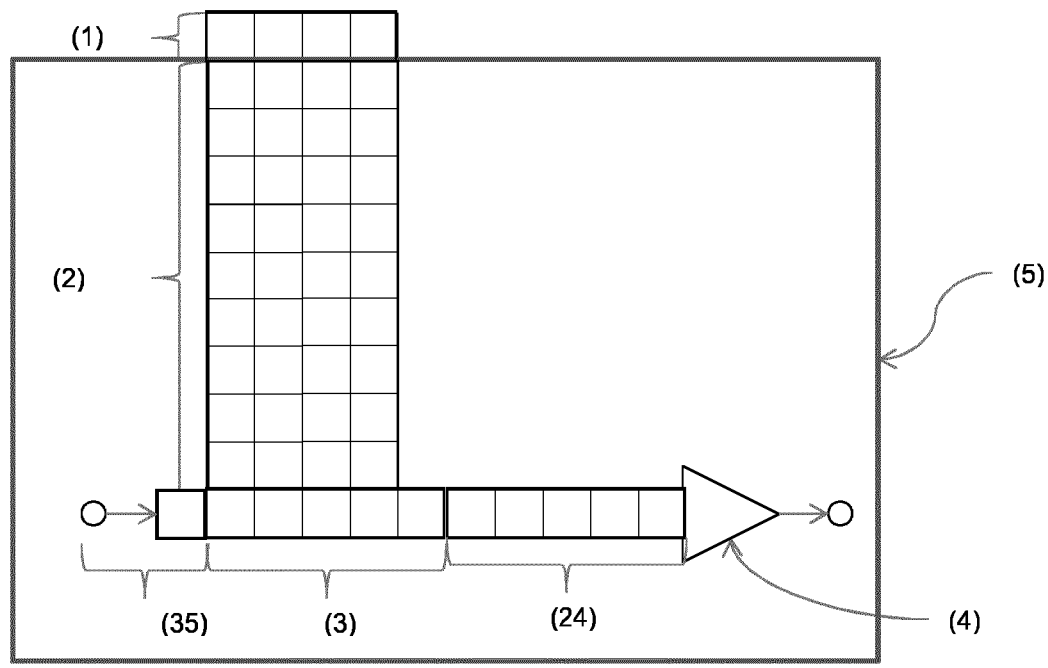
FIG. 4 shows a further example of a time of flight sensor with an electron multiplication register.

The performance of the time of flight sensor described here can be improved by the use of an electron multiplication (EM) register (24) inserted between the readout section and output amplifier as shown in FIG. 4. Such EM registers are typically implemented in CCD technology using a modified register structure that is operated with a high voltage clock signal applied to one of the electrodes (RØ_HV). This encourages impact ionization as charge packets are transferred in the CCD silicon along the EM register and, although the probability of impact ionisation and hence mean gain per register stage is low, by using N multiple stages the total gain, G, can be increased to useful levels as expressed in the following equation:

$$G \approx (1+\beta e^{sV})^N \quad \text{Equation 3.}$$

Where:
$\beta$ is a factor dependent upon temperature and time;
s is a factor that varies with device structure;
V is related to the amplitude of the RØ_HV high voltage clock; and
N=the number of multiplication stages.

However, a problem with such EMCCD registers is that as the gain is increased (by either increasing the high voltage clock amplitude or the number of multiplication stages) the dynamic range of the sensor is reduced because the signal amplitude is increased by the total multiplication gain but the peak signal handling capacity of the register remains the same.

As a worked example, for a readout rate of 10 MHz, a typical imaging CCD sensor with an EMCCD readout will have a full well capacity of 100,000 electrons and a readout noise (Fr=10 MHz) without EMCCD gain of 35 rms electrons giving a dynamic range of ~2800:1. If an EMCCD gain of G=100 is used, the signal amplitude is increased by 100×. This reduces the effective noise to less than 1 rms electron but limits the effective maximum signal level before saturation occurs to just 1000 electrons, reducing the dynamic range by a factor of 3.

This constraint can be somewhat mitigated through the use of an EMCCD register with increased charge handling capacity. However, for time of flight sensors, signal levels from close objects can easily be up to 100000 electrons or beyond whilst signal levels from far objects can only be a few electrons and hence the dynamic range constraint of EMCCDs is a significant problem for lidar and rangefinder applications.

However, with the time of flight sensor architecture proposed here, there is a direct and predictable relationship between the number of the row that is being readout r and the distance to the objects whose return signals are detected in that row (equation 1). From equation 2 the maximum signal level in each row will be:

$$P_{Rmax} = T_T T_R \frac{\rho_{dmax}}{\pi} P_0 A_R \left(\frac{2F_t}{cr}\right)^2 \quad \text{Equation 4}$$

Where
$\rho_{dmax}$=the maximum Lambertian reflection coefficient

The inventor has realised that by synchronising the EMCCD gain so that it changes consistently with readout row number: i.e. by making the EMCCD gain a function of the row number r, the EMCCD gain can be made low for close objects when r is small and high for far objects when r is high.

One method for achieving this is described with reference to FIG. 5. The time of flight sensor drive circuit (16) is configured to output the current line count as a digital word (25) that is used to drive the address bus of a look up table memory (26). The look up table's data bus (27) drives the data input of a digital to analogue (DAC) converter (28). The analogue output of the DAC (29) is amplified (30) to create a control voltage (31) that is input to a resonant oscillator circuit (32) whose phase and frequency are locked to the CCD readout frequency by a synchronisation signal (33) generated by the time of flight sensor drive circuit (16) and whose amplitude is controlled by voltage (31). The oscillator output (34) is used to drive the EMCCD RØ_HV high voltage clock thus allowing the EMCCD RØ_HV clock amplitude and hence EMCCD gain to vary in a predictable manner with row number in accordance with the look up table (26).

Many approaches could be used to determine the appropriate gain variation with row number. One method is to implement a gain vs row number relationship that is the inverse of the expected signal variation with range to achieve a signal level from a remote object that is approximately constant over a range of distances to the object. From equation 5 and using a simplified form of equation 4 it can be shown that for a usual gain range this condition will be achieved when:

$$\frac{r^2}{r_0^2} \sim \frac{\exp(N\beta\exp(sV))}{M_0}$$

Where:
r=row number
$r_0$=row number at which the gain adjustment starts to be implemented
$M_0$=base gain setting at row $r_0$ Based on this relationship, the RØ_HV clock amplitude variation with row number V(r) necessary to achieve constant signal level between $r_0$ and $r_{max}$ can be calculated from:

$$V(r) = \begin{cases} V_0, & r \leq r_0 \\ \frac{1}{s}\ln\left(\frac{1}{N\beta}\ln\left(M_0\frac{r^2}{r_0^2}\right)\right), & r_0 < r \leq r_{max} \\ V_{max}, & r > r_{max} \end{cases}$$

Where:

$$V_{max} = R\emptyset\_HV \text{ clock amplitude at } r_{max} = \frac{1}{c}\ln\left(\frac{1}{N\beta}\ln\left(M_0\frac{r_{max}^2}{r_0^2}\right)\right)$$

The look up table numbers can then be calculated and programmed from V(r) using knowledge of the scaling between the look up table number and the RØ_HV clock amplitude.

Figure 6:
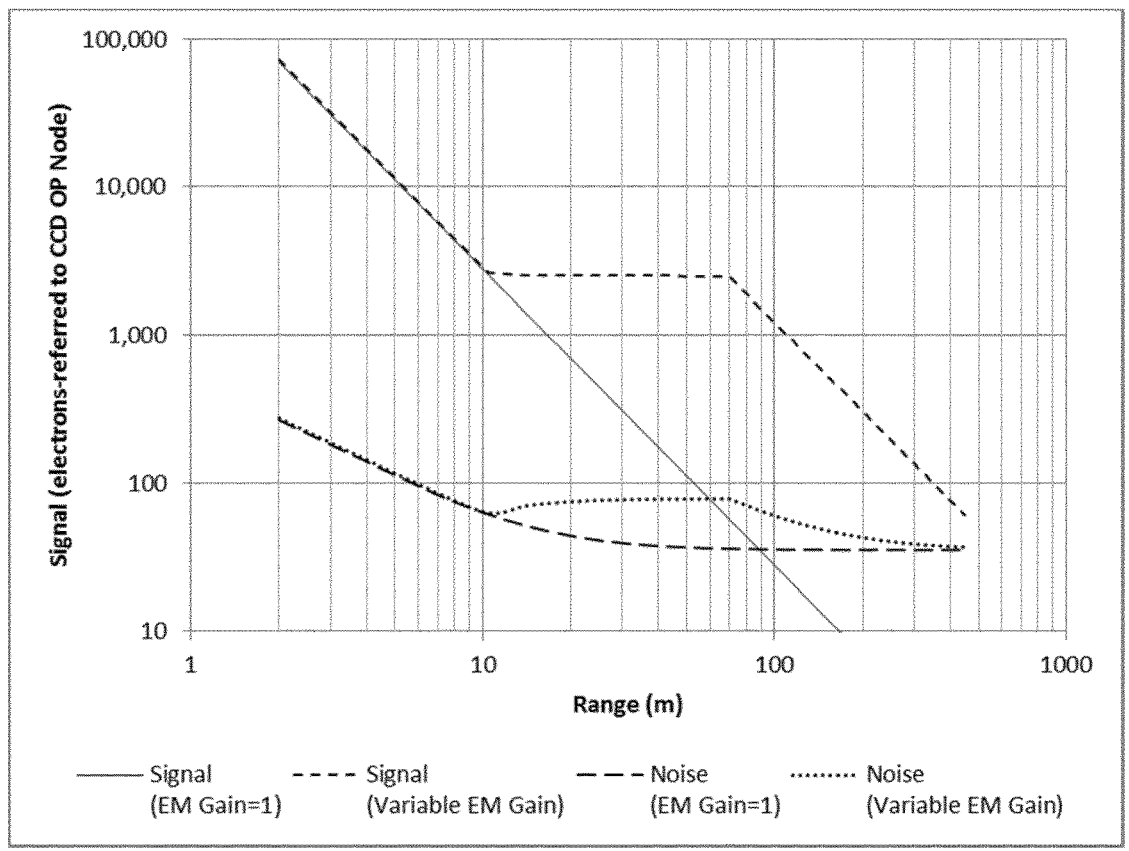
FIG. 6 illustrates the sensor signal and noise variation achieved using the time of flight sensor of FIGS. 4 and 5.
Figure 7:
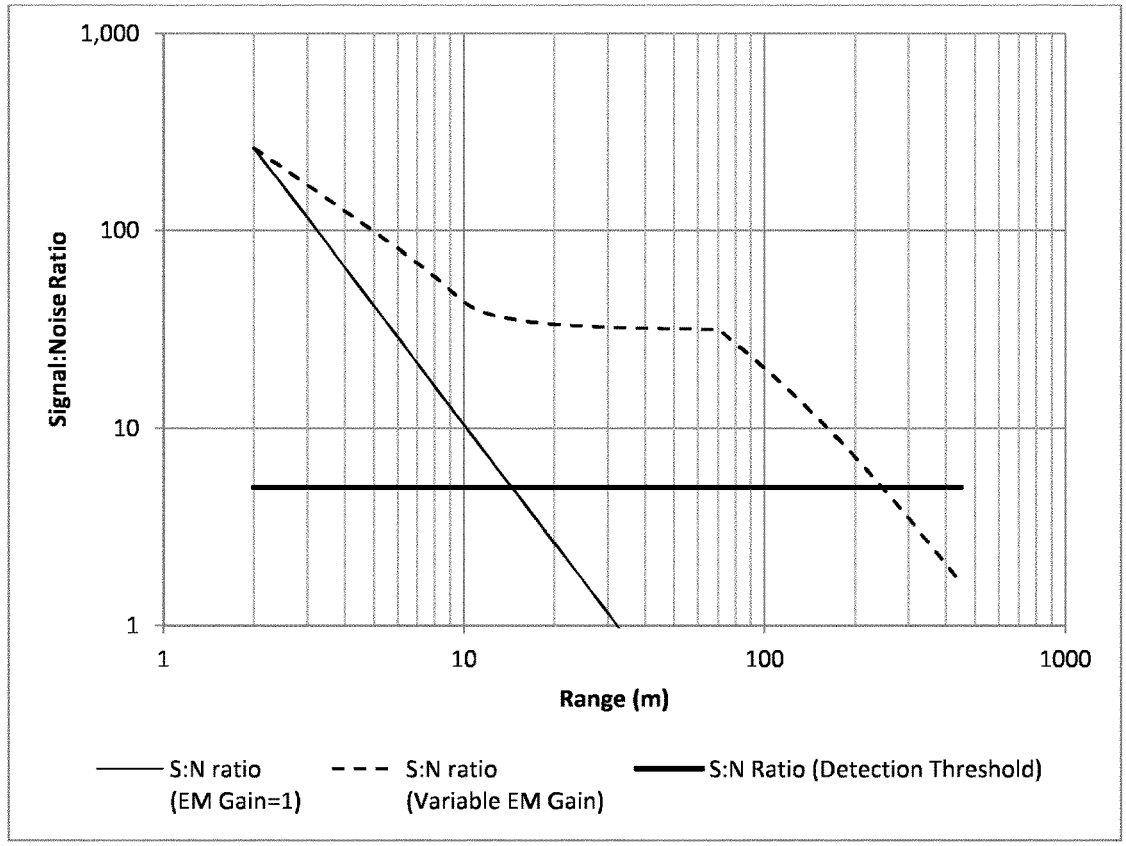
FIG. 7 illustrates the signal to noise ratio achieved using the time of flight sensor of FIGS. 4 and 5.

FIG. 6 shows the sensor signal and effective noise levels with and without the variable EMCCD gain and FIG. 7 shows the significant improvement in signal to noise ratio offered by synchronising the EMCCD with readout number. For a typical detection threshold equal to a signal to noise ratio of 5, it can be seen that this approach extends the maximum operating range by more than 10× without any risk of saturating the sensor at shorter ranges as would be the case with a fixed EM Gain.

It is important to note that the proposed approach is fundamentally different to existing rangefinder methods where the electronic gain and/or detection threshold are made variable with a time delay related to the laser pulse emission. This is because in the time of flight sensor the EM gain G is a charge gain, i.e. a multiplication of the number of electrons, that is applied to the signal charge before conversion to a voltage or current hence delivering a signal to noise ratio improvement of ~G, whereas if the same gain is applied electronically after charge conversion the signal and noise are both amplified by G so the basic signal to noise ratio is not improved at all.

So far as the inventor is aware, this approach has not been used in other rangefinders/lidar systems before because previous rangefinder/lidar architectures would require the gain of the amplifying element, whether an avalanche photodiode (APD) or an EM CCD register, to be changed during the time of flight signal capture. However, changes in the high voltage APD bias or RØ_HV clock amplitude necessary to adjust the gain during signal acquisition will be electrically coupled through to the rangefinder signal, corrupting the signal by introducing additional noise and distortion. As a result, rangefinder/lidar system designers normally take great efforts to keep the APD bias or RØ_HV clock amplitude absolutely stable to avoid adding noise to the signal.

In contrast, as the time of flight sensor architecture described here makes the readout process independent of the time of flight signal capture, EM gain changes can be applied in a manner that does not corrupt the signal. For example, the RØ_HV clock amplitude change necessary to adjust the EM CCD gain can be applied during the line transfer period (19) followed by a short delay period as necessary to allow all voltages to fully settle before the next row is readout (20).

EM Gain Compensation

The EM Gain factor β is dependent upon temperature and operating time. To compensate for this variation, an input structure (35 in FIG. 4) is added to the readout section (1). After the time of flight signal within the readout register has been readout, the input register is clocked to input charge packets of known signal amplitude into the readout section. These charge packets are amplified by the EM gain mechanism in the same way as the range signal charge packets and their signal level is measured. From knowledge of the initial size of the charge packet and the level of the corresponding signal detected at the output of the sensor, the EM gain can be measured and the look up table contents re-calculated to compensate for any gain variations due to temperature or operating time.

Figure 5:
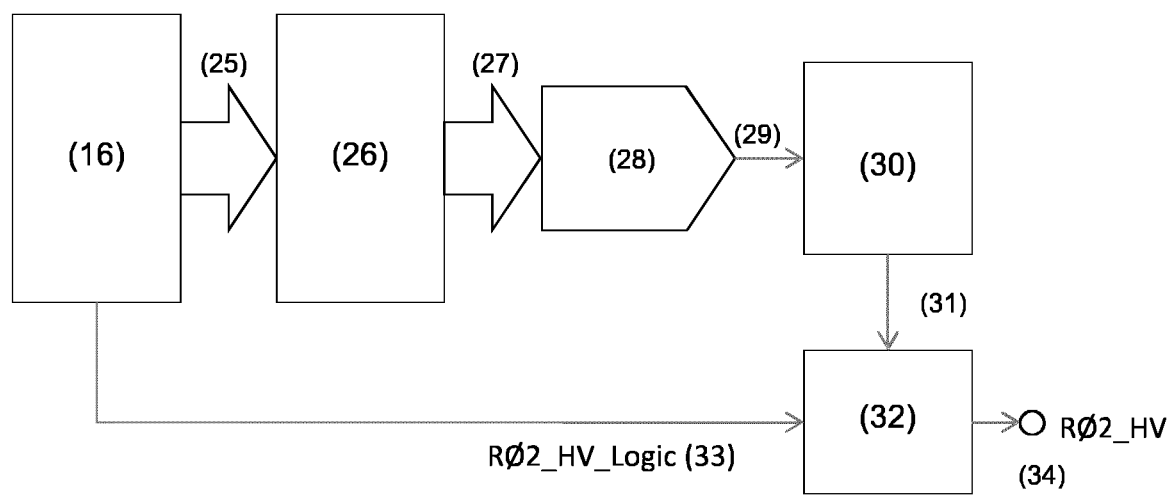
FIG. 5 is a block diagram of the variable electron multiplication gain used in the sensor shown in FIG. 4.

Alternatively, if the DAC (28) in FIG. 5 is a multiplying type, whereby its output (29) is the product of the digital input word (27) and a reference voltage, then adjusting the reference voltage will allow the EM gain change to be compensated without needing to recalculate the look up table contents.

For a CCD based time of flight sensor, one method of implementing the input structure (35) is to use the well-known "fill and spill" structure and operating method.

Variable Period Readout

Another approach to improving the signal to noise ratio is as follows:

At readout rates above 100 KHz, CCD readout noise is predominately white and it can be shown ("Noise reduction techniques for CCD image sensors" G. Hopkinson and D. Lumb, J. Phys. E: Sci. Instrumm., Vol. 15, pp. 1214-1222, 1982) that using the optimal readout technique of dual slope integration the noise level $V_n$ is given by:

$$V_n = e_{ccd}\sqrt{\frac{2}{T_0}}$$

Where:
$e_{ccd}$=CCD white noise density
$T_0$=readout clock period

For a constant readout clock period of $T_0$, a time of flight sensor of M elements with N rows will take a time Tm=M*N*$T_0$ to readout the sensor.

However, as the signal amplitude from a reflected laser pulse declines with range and the time of flight sensor readout clocking defines a fixed relationship between the range and readout clock cycle at which the captured photocharge packet from a specific range is readout, the inventor has realised that by making the readout clock period a function of the row number (r) the total readout time can be reduced whilst minimising the readout noise for the longer range, lower level signals.

For example: one approach is to make the readout clock period proportional to the row count, e.g.:

$$T_r = T_0\frac{r}{N}$$

With this approach, the readout noise for the $r^{th}$ row during the readout process will be given by:

$$V_n = e_{ccd}\sqrt{\frac{2N}{T_0 r}}$$

The readout noise for the last row (r=N) will be the same as for a constant readout period case with $T_r=T_0$.

The readout noise for the first row (i=1) will be IN times higher but as objects that generate a reflected signal in the first sample must be N times closer, their signal level will be $N^2$ higher in level (from equation 1) and hence the overall signal to noise ratio from these samples will still be $N\sqrt{N}$ times higher and sufficient to accurately determine the range. However, the total measurement time $T_m$ for the proportional clock period approach is now given by:

$$T_M = T_0 \frac{M(N+1)}{2}$$

Hence, whilst the noise level for the low signal level long distance reflections has been kept the same, the readout time has been reduced by a factor of two.

The variable readout rate process described is preferably implemented using a digital correlated double sampling readout circuit as the variable readout rate can be simply achieved by changing the oversampling factor used by the digital correlated double sampling circuit.

It will be apparent to those skilled in the art that other functions can be chosen for the variation of readout period with row number to deliver different trade-offs between the total readout time and signal:noise ratio vs distance relationship.

Enhancements to the Sensor Architecture

Parallel Readout

To reduce the total readout time from the time of flight sensor further, a parallel readout architecture can be employed.

Figure 8:
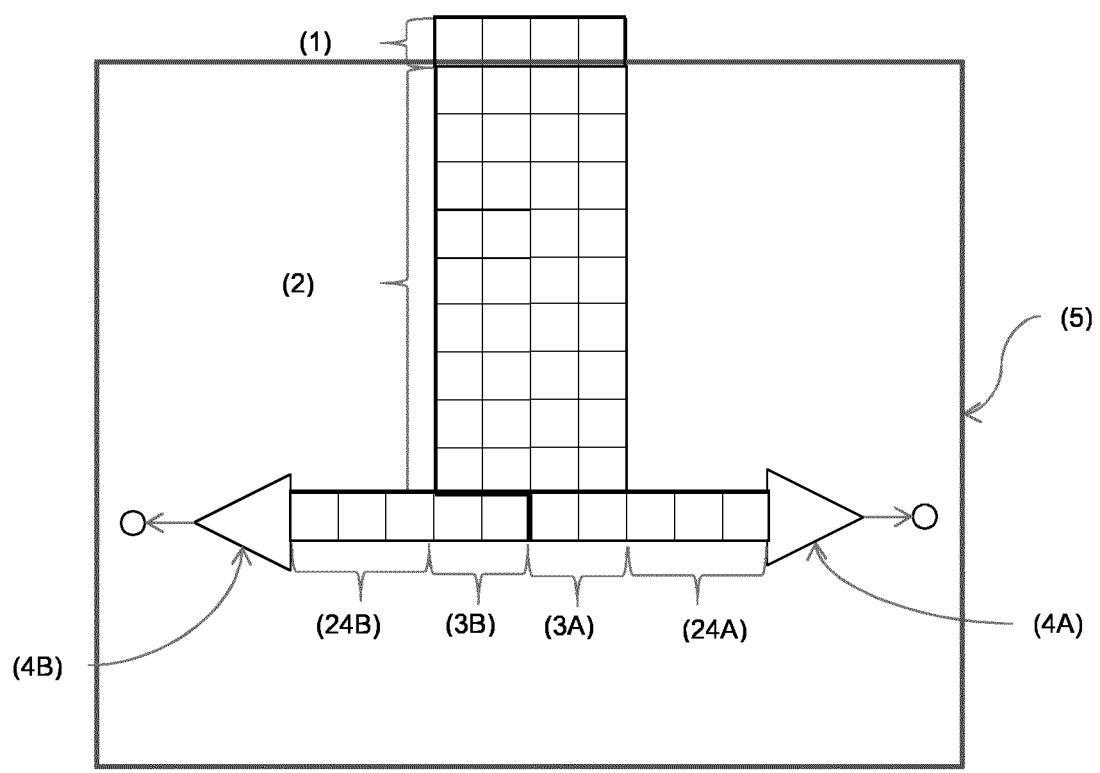
FIG. 8 illustrates an example of a time of flight sensor with parallel readout.

A simple approach is shown in FIG. 8 where the readout section (3) is split into two sections (3A and 3B) and separate EM gain registers (24A and 24B) and output amplifiers (4A and 4B) are provided. Readout section 3A and EM Register 24A are configured to transfer charge from the left to the right whereas readout section 3B and EM gain register 24B are configured to transfer charge from the right to the left. In this way, clocking registers 3A and 3B and EM gain registers 24A and 24B at the same time causes captured charge in the right half of storage section (2) to be transferred to output amplifier 4A and charge in the left half of storage section (20) to be transferred to output amplifier 4B, halving the time to readout data from the array for the same readout frequency Fr. The number of parallel readout channels and outputs is not limited to two but can be increased further.

Figure 9:
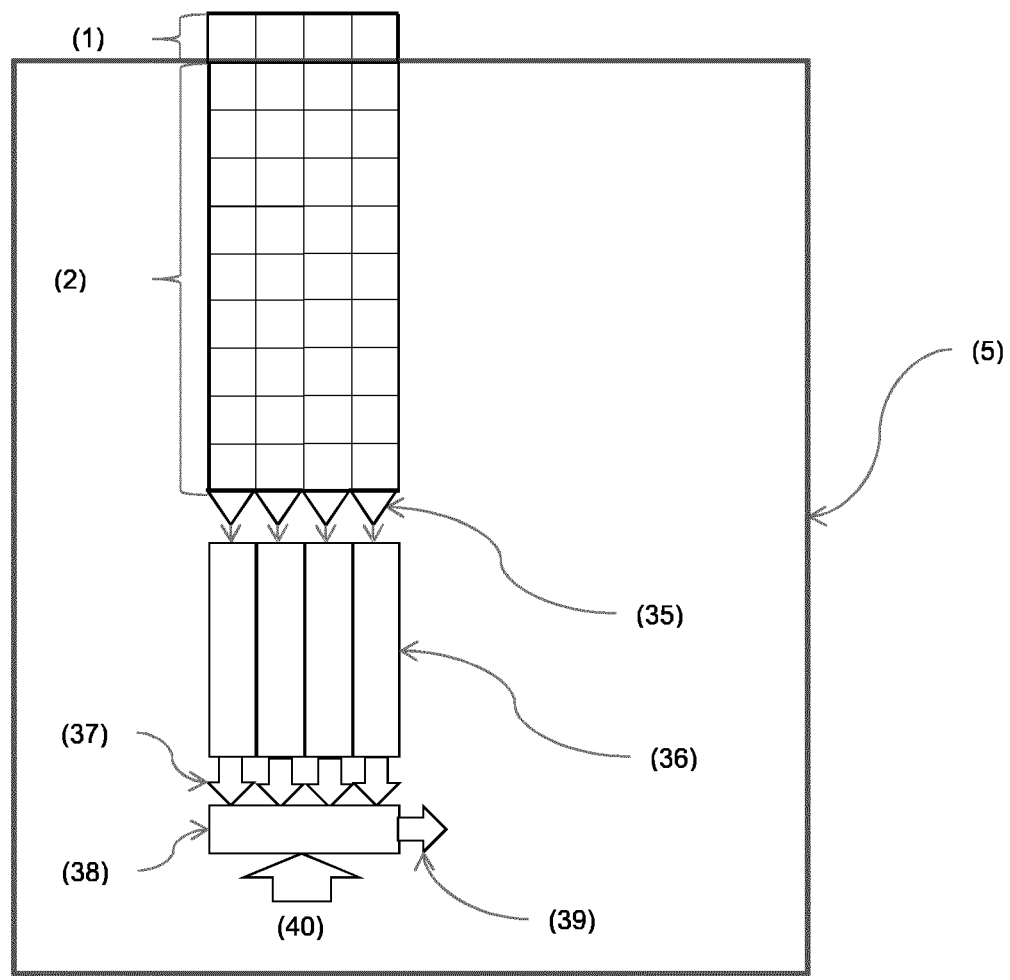
FIG. 9 illustrates a further example of a time of flight sensor with parallel readout.

FIG. 9 shows a preferred embodiment of a time of flight sensor that uses a fully parallel readout architecture where separate output circuits (35) and analogue to digital converters (ADC) (36) are provided, one for each column of the device. When a row transfer (19) is carried out, a row of charge packets is transferred to the output circuits and ADCs that convert the charge packets from each column of the device into a set of digital numbers (37) in parallel.

A multiplexor (38) then allows the column data for each row to be readout of a digital interface bus (39) in accordance with a column address input (40).

The main benefit of this parallel readout architecture is that it only requires one pixel readout per row thus offering a significant increase in pixel readout time Tr and an associated reduction in noise level. This reduction in noise level is sufficient to allow successful operation in many applications without the need for any further noise reduction methods.

Figure 10:
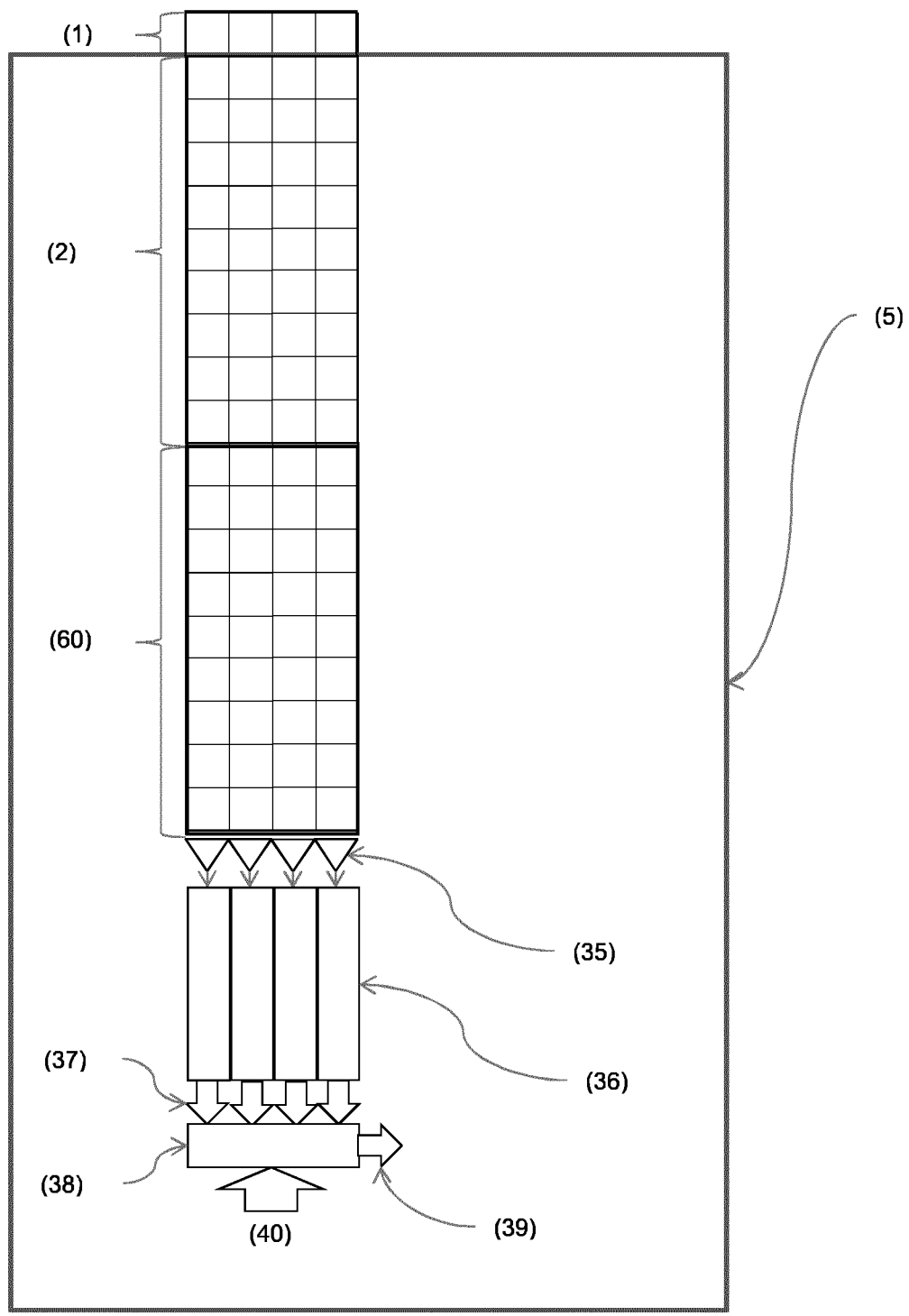
FIG. 10 illustrates a further example of a time of flight sensor with parallel readout and electron multiplication.

However, for those applications where additional noise reduction is helpful then, as the relationship between the reflected signal distance and row readout number is preserved, the optimisation approaches described in 3.1 and 3.2 are equally applicable. In the case of an EM CCD approach, the store section (2) could be implemented as a set of EM CCD multiplication column registers. However, it is generally more effective to insert an additional EM register section (60) between the output of the store section (2) and the row of output circuits (31) to multiply each row in parallel as shown in FIG. 10.

In this case, the number of EM CCD multiplication stages that the rows of charge packets pass through increases linearly with row number, automatically providing additional gain as the row number and hence remote object distance increases. It will be understood that the strength of the effect depends upon the number of rows in the storage and EM register sections.

Range Gating

Specular reflectors within the sensor's field of view may generate very high signal levels within the sensor. Examples of such objects include highly polished plane surfaces, mirrors and road signs manufactured from prismatic or micro-corner cube based reflective materials. If the signal level generated by such objects exceeds the charge storage capacity of the sensor, the excess charge will leak into adjacent potential wells, causing a loss of information.

This problem, known as "blooming" in image sensors, can be addressed in the time of flight sensor through the use of well-known anti-blooming structures. Such structures work by providing a drain structure along one edge of each image section pixel that is separated from the pixel by a potential barrier whose level is set such that excess charge flows preferentially into the drain structure, rather than into adjacent pixels.

The anti-blooming potential barrier may be defined by an electrode or by diffusion or implantation during manufacture. The electrode approach has the benefit that the anti-blooming potential barrier level can be adjusted by changing the voltage applied to the electrode whereas with the diffusion/implantation approach the barrier level is fixed during manufacture.

For normal image sensors, the anti-blooming potential needs to be fixed during image capture and frame transfer to maintain the peak signal level constant for all pixels.

In contrast, for the time of flight device, operation of the sensor can be optimised by controlling the anti-blooming potential during the frame transfer period so as to match the dynamic range of the readout process with the expected signal level and prevent saturation, which is particularly beneficial for time of flight sensors employing an EM or similar amplifying register.

Figure 11:
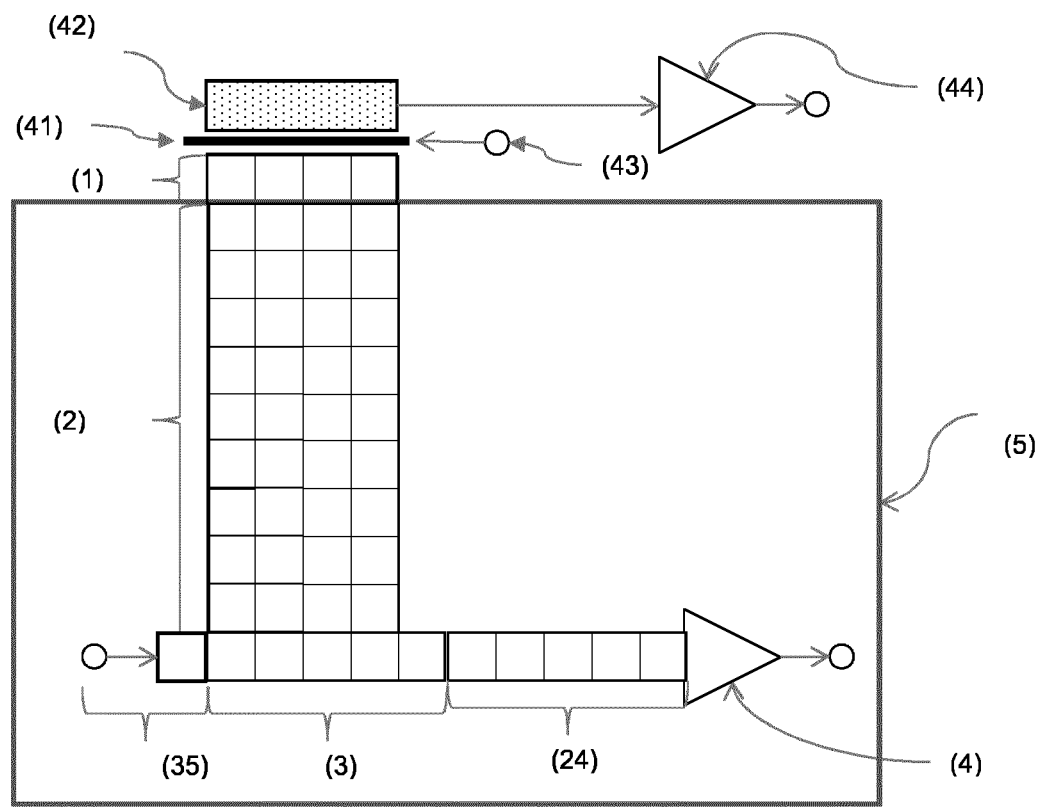
FIG. 11 illustrates a further example of a time of flight sensor with a gated anti-blooming structure.

As illustrated schematically in FIG. 11 an anti-blooming electrode or gate (41) is provided to separate the elements of the image section (1) from a drain structure (42). The height of the potential barrier between each image section element and the drain structure is controlled by the voltage applied to the electrode (41) via connection (42) from a controllable voltage source (43).

Figure 12:
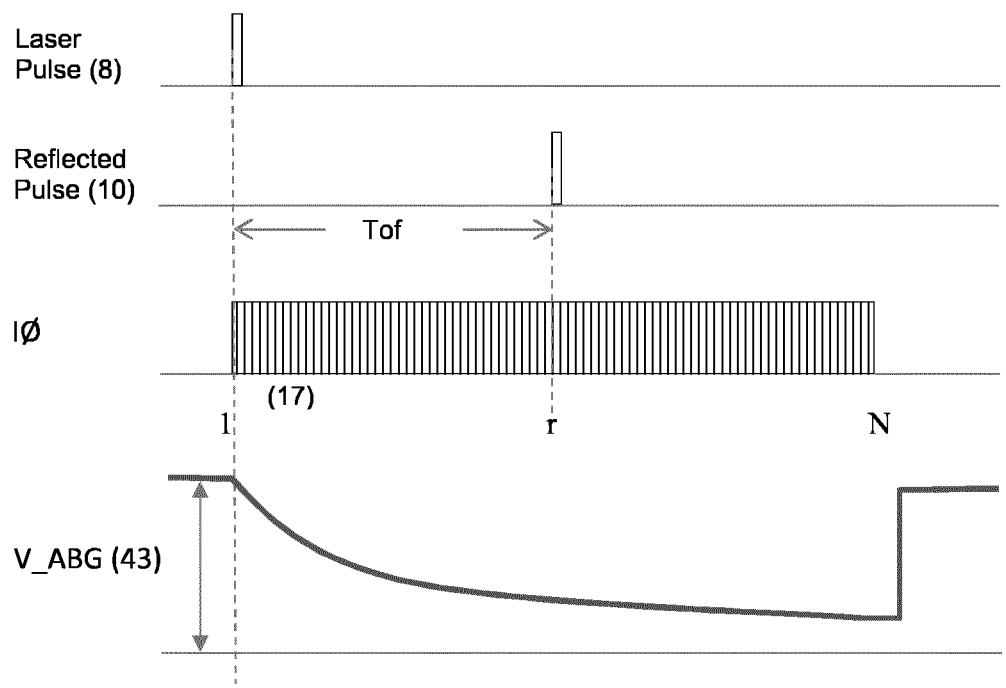
FIG. 12 shows the gate voltages applied to the gate illustrated in FIG. 11 to achieve anti-blooming.

During the frame transfer period (see FIG. 12) the image and store sections are clocked together to capture and transfer photo-generated charge from the image section into the store section. In addition, the sensor control circuit (16) reduces the voltage applied to the anti-blooming gate electrode (41) in synchronism with the frame transfer process so that the anti-blooming level declines with increasing row number. In this way, the relationship between the peak allowable signal level and the maximum expected signal level—see equation 5—can be maintained independent of the object's range.

One method of controlling the anti-blooming voltage is to use a look up table and digital to analogue converter where the look-up table translates the frame transfer clock cycle into the required anti-blooming gate voltage, but other methods will be apparent to those skilled in the art.

If there is an optical overload, then excess charge will flow into the anti-blooming drain and this current flow can be detected and measured by using an amplifier (44) to provide an early indication that an overload has occurred. The responsivity of the overload monitor can be improved by dividing the drain into multiple regions to reduce capacitance and providing each drain region with its own amplifier. This also allows the region of the image sensor that is suffering optical overload to be identified.

For many time of flight sensors it is useful for the sensor to be insensitive to reflections from close objects. For example, sensors that are operated behind windows may suffer from reflection from the windows' surfaces, particularly in automotive applications where the outside surface accumulates dirt over time.

Figure 13:
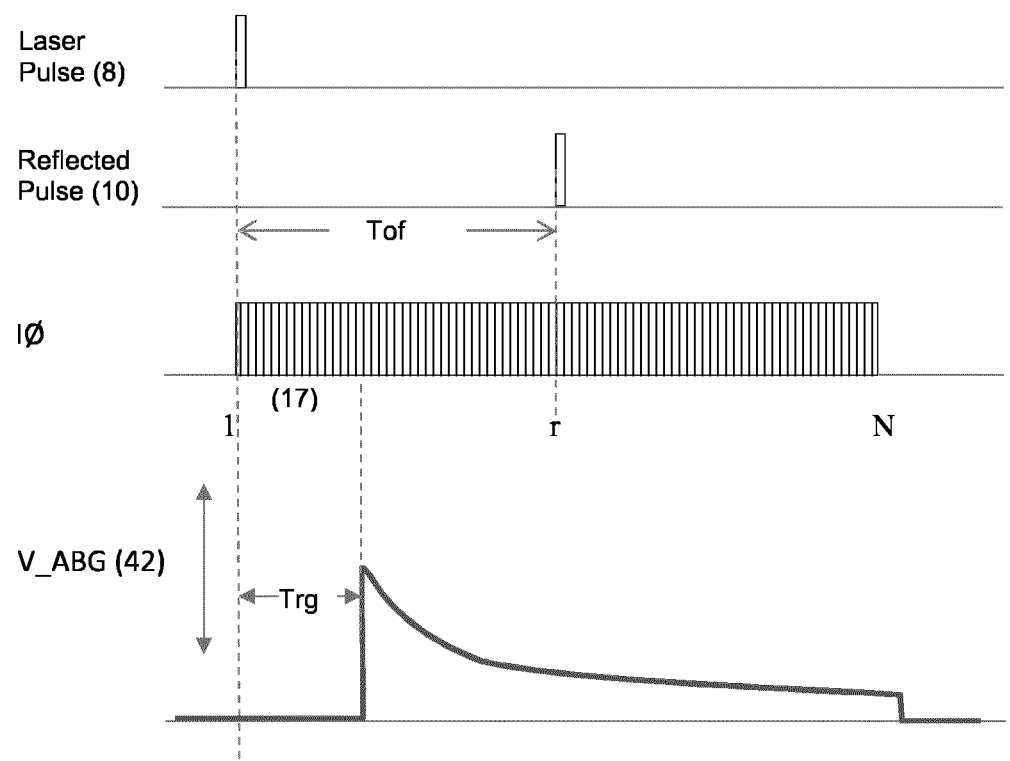
FIG. 13 shows the gate voltages applied to the gate illustrated in FIG. 11 to achieve range gating.

Such a "range gating" capability may be implemented by controlling the anti-blooming gate voltage as shown in FIG. 13. Initially the anti-blooming voltage (42) is set to a low voltage such that the potential barrier between the image section elements and the drain structure is removed. In this case, all the photo-generated charge will be cleared into the drain, rather than being collected in the image section picture elements, and hence the sensor becomes insensitive to illumination. Once the range gating period (Trg) is finished, the anti-blooming gate voltage is returned to its normal operating potential. The effectiveness of the charge clearing process may be increased by reversing the phase of the image section clock sequence during the range gating period. This allows the fringing fields generated during sensor clocking to speed up the charge clearing process.

This range gating capability also enables the use of a multi-mode process to extend the maximum range of the sensor whilst maintaining eye safety as follows:
a) The sensor is first operated in a mode whereby the emitted peak power is set so that the nominal ocular hazard distance (NOHD) of the sensor is zero (i.e. the sensor is completely eye safe) and the peak signal level captured by the sensor from valid targets at the minimum operating distance of the sensor is just within the maximum linear signal handling capability of the sensor. In this mode, range data is calculated for those targets whose reflected signal level yields a signal to noise ratio above a given threshold.
b) The sensor is then operated with the emitted peak power increased (e.g. 10×) and with the anti-blooming gate held low for a period corresponding to the time after which the signal level from far objects will have fallen below the maximum linear signal handling capacity of the sensor. In this way, reflections from close objects that would overload the sensor are rejected whilst the range to objects further away than can be detected in mode a) can be measured due to the increased optical power emitted.

The choice to use the higher peak power, extended range mode b) is made dependent upon the results from mode a) such that mode b) is only used if the range measurements from mode a) show that there are no objects in the field of view whose distance is less than the NOHD of mode b) operation.

By combining the range measurements from both a) and b) operating modes the minimum and maximum ranges of the overall data set will be greater than achieved by either individual data set.

Depending upon the application, the utility of this multi-mode operation can be enhanced by dividing the light emitter (8)/transmit lens system (9) into a series of light emitters and lenses arranged so that the peak power of each emitter can be controlled individually and each emitter/lens combination illuminates a region of the illuminated stripe (11).

The choice to use the higher peak power mode b) is then made for each illuminated region rather than for the whole array, allowing the maximum eye safe range to be optimised on a region by region basis.

This approach is particularly beneficial in automotive applications where the field of view is arranged as a horizontal stripe with the central region illuminating the road ahead and the outer regions illuminating the side of the road. In urban areas, the central sections can then use a high power to detect cars at long distances, if pedestrians are present the outer sections will automatically limit the emitted power to ensure eye safety.

Additional Improvements/Points to Note

- This approach can equally be applied to single pixel detectors (i.e. M=1)
- This approach can benefit from the many optimised pulse discrimination and detection approaches such as those taught in "Precise pulsed time-of-flight laser range finder for industrial distance measurements" (A. Kilpelä, R. Pennala and J. Kostamovaara, *Review of Scientific Instruments*, Vol 72(4), pp. 2197-2202, April 2001) and "CMOS receiver for a pulsed TOF laser rangefinder utilizing the time domain walk compensation scheme" (S. Kurtti and J. Kostamovaara, in 20*th IMEKO TC*4 *International Symposium and* 18*th International Workshop on ADC Modelling and Testing*, Benevento, 2014) developed to allow sub-sample measurement precision, but with easier implementation and reduced costs due to the much lower readout frequency.
- Whilst described in the context of a pulsed laser rangefinder system, this approach is equally applicable to modulated light schemes such as a maximal length sequence as described in U.S. Pat. No. 6,753,950 or grey code, sinewave, chirp or similar that allow additional light energy to be emitted with an attendant increase in signal to noise ratio. In these cases, the pulse discriminator and detector would be replaced with a cross correlator or similar signal processing circuit such as described in U.S. Pat. No. 6,753,950.
- Standard readout noise reduction techniques well known to those familiar with the state of the art can be employed, such as correlated double sampling as described in "Noise reduction techniques for CCD image sensors," (G. Hopkinson and D. Lumb, *J. Phys. E: Sci. Instrumm*., Vol. 15, 1982, pp. 1214-1222, 1982) or digital correlated double sampling as described in "Optimal digital correlated double sampling for CCD signals," (K. D. Stefanov and N. J. Murray, Electronics Letters, 50(14), p. 1022-1024, 2014).
- The time of flight sensor and the associated control, drive and signal processing circuitry could be integrated on a single monolithic integrated circuit to minimise size and cost.
- The operating method of the sensor can be changed dynamically to interleave distance and intensity information capture modes allowing a 2D distance profile and intensity information to be gathered with perfect spatial registration between the two data sets.

A colour filter matrix can be placed on top of each pixel in the normal manner used to create a colour CCD image sensor. By choosing the matrix appropriately, and switching the operating modes, the sensor could be used to capture colour and distance information. This approach could be beneficial in airborne imaging applications to combine hyper-spectral imaging with distance measurement for terrain mapping, and long range surveillance.

An additional storage region can be provided to allow multiple pulses or modulation sequences to be integrated prior to charge detection. The benefit of this is that the integration process within a CCD is essentially noiseless and hence the signal to noise ratio can be significantly enhanced.

Figure 14:
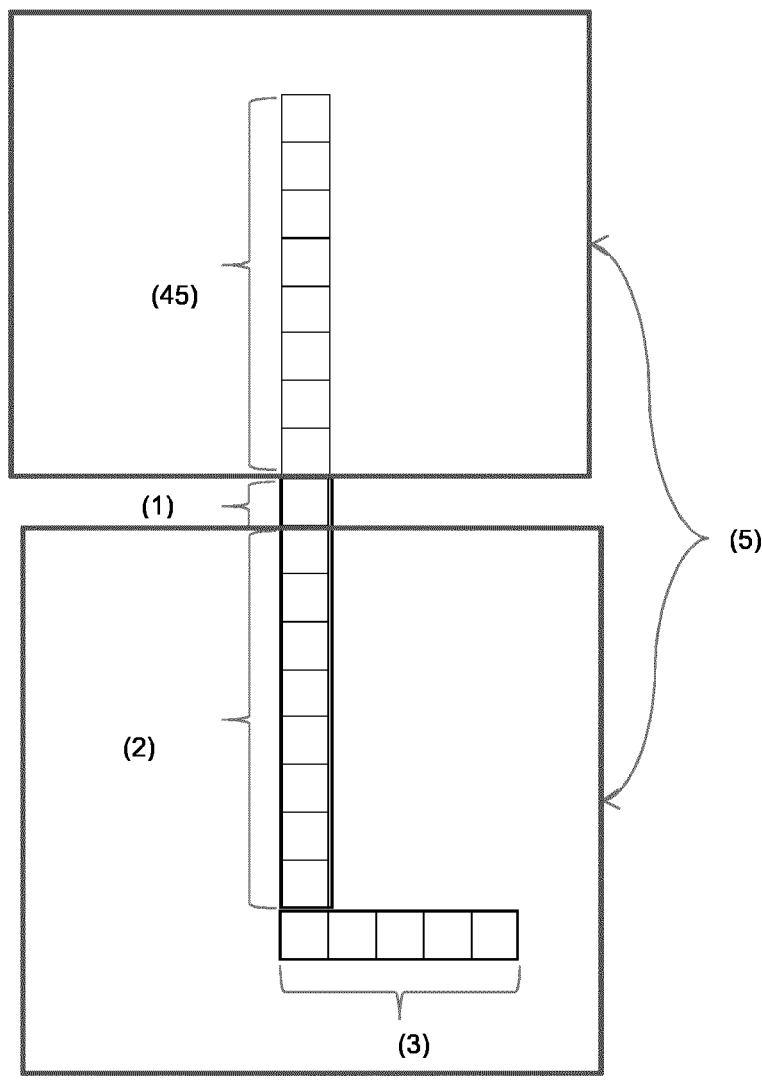
FIG. 14 illustrates a further example of a time of flight sensor having a separate store section.

One simple approach is illustrated in FIG. 14 with reference to a single column of the device.

An additional store section (45) is positioned above the image section (1) and is covered by the opaque shield (5).

With this sensor, the first phase of operation is to emit light pulse (15) and clock the image (1) and store (2) sections together (17) to sample and capture the reflected signal (18) in store section (2).

In the second phase of operation the image section (1) and store sections (2) and (45) are clocked together but with the phase of the clock sequence reversed so as to transfer the captured time samples vertically upwards through the image region and into store section (45). During this process the light emitter (8) is turned off.

Phase 1 is then repeated with the image, store (2) and additional store (45) sections clocked together and a light pulse (15) emitted by light emitter (8). This transfers the previously captured frame of information through the image section again with the result that reflected light from remote objects (24) will be captured at the same point in the clocking sequence and hence by the same potential wells that captured the reflected light signal in the previous frame. In this way, the signal from reflections is sampled synchronously with the previous sampling process and so the amplitude of the photo-generated signal will be doubled. This process is then repeated to increase the signal level further before readout through the output register (3) in the normal way.

To those skilled in the art it will be apparent that this is but one way of implementing an additional storage region to allow synchronous integration and several alternative approaches, including more complex architectures using an additional transfer electrode structure to avoid having to clock the captured signal through the image section, could be employed.

Applications

The time of flight Sensor described here is a linear array sensor: i.e. it is able to measure a 2D distance profile (and intensity or colour using the approach noted above) without mechanical scanning.

Such time of flight sensors can be used to replace mechanically scanned single element lidars for a wide variety of applications including collision prevention and navigation systems for automatic guided vehicles, area protection/access protection, stack profiling and so on.

The time of flight sensor could be integrated into an airbourne or spacebourne platform where the sensor field of view is arranged to be orthogonal to the direction of motion of the platform over the ground, thus building up a 3D profile as the platform moves. If the time of flight sensor integrates a colour filter matrix then it can capture image information in colour or hyperspectral imaging information at the same time.

Figure 15:
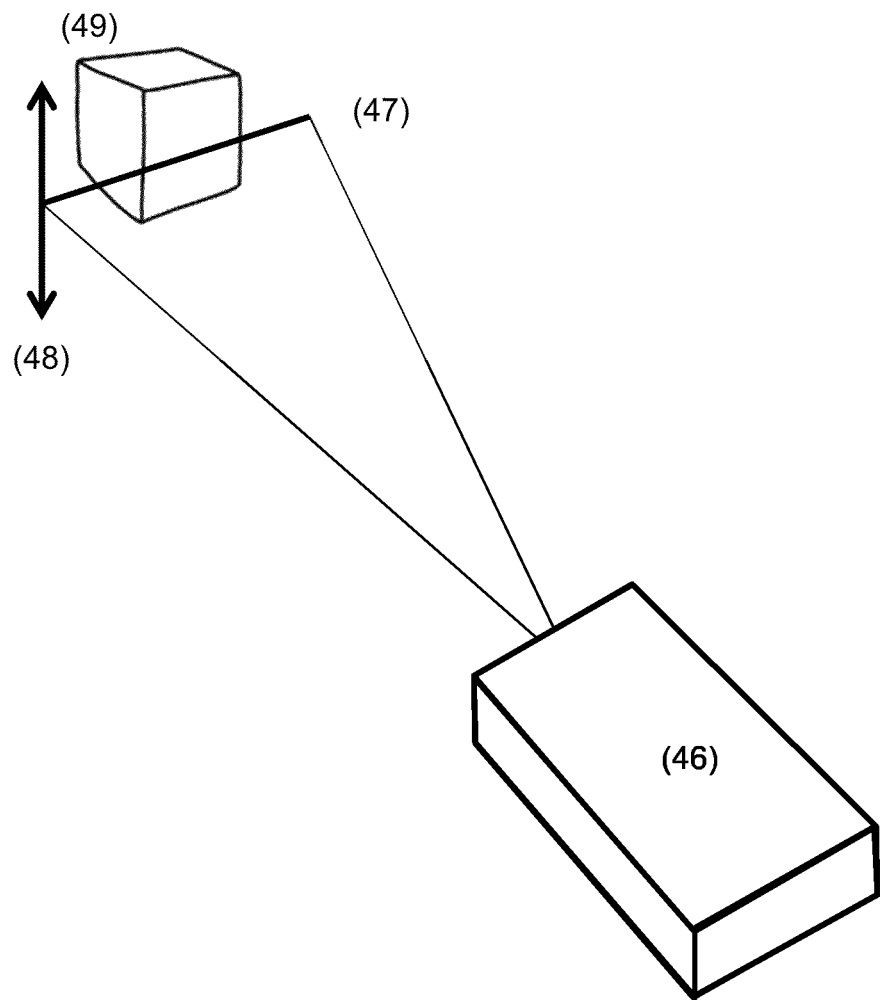
FIG. 15 illustrates a further example of a time of flight sensor integrated in a smartphone or tablet.

For consumer applications, the time of flight Sensor could be incorporated into a handheld device as shown in FIG. 15. A smartphone or tablet computer (46) contains the time of flight Sensor and light emitter arranged to collect range and/or intensity/colour data from a field of view (47). The user physically scans (48) the field of view across a far object (49) and the internal accelerometer and digital compass within the device (46) are used to measure the instantaneous attitude of the time of flight Sensor linear field of view at each time of flight capture event. The instantaneous attitude data for each linear distance profile captured by the time of flight Sensor allows a 3D mesh of distance data across the far object to be computed, displayed on the screen of the device (42) and/or saved to the device memory or cloud based storage.

Existing solutions based on triangulation methods (e.g. The Structure Sensor from Occipital Inc (http://structure.io/) are limited to indoors, short range applications whereas the time of flight sensor approach described here would allow 3D scans to be obtained of external objects and large structures.

Extension to Full 3D Sensing

Mechanically Scanned Time of Flight Sensor Assembly

U.S. Pat. No. 7,969,558 describes a high definition lidar system that is based on a preferred embodiment that uses 64 discrete laser emitter/avalanche photodiode detector pairs and 64 channels of associated electronics to capture time of flight information. Each discrete laser emitter/avalanche photodiode pair is physically aligned in ⅓° increments to cover a ~24° vertical field of view. The complete arrangement is then rotated through 360° at a 10 Hz rate to scan and generate a 360° 3D map of the surroundings. A slipring is provided to allow power and data to be passed between the rotating sensor and the main body of the attached vehicle. The sensor described in this patent is manufactured by Velodyne and is used by many of the driverless car development teams.

The complicated and costly arrangement of many laser emitter/detector pairs described in U.S. Pat. No. 7,969,558 could be replaced in its entirety by a time of flight System using the time of flight Sensor as shown in FIG. 2, but with the field of view (11) orientated vertically. With this arrangement, the scanning system would sweep the vertical field of view to scan and generate a 360° 3D map of the surroundings in a similar way to U.S. Pat. No. 7,969,558 but at considerably reduced cost, allowing the benefits of the approach to be made more widely available.

Time of Flight Focal Plane Array Sensor with Scanned Laser.

For many applications it is not necessary to gather a full 360° 3D map and a more limited field of view is sufficient.

Figure 16:
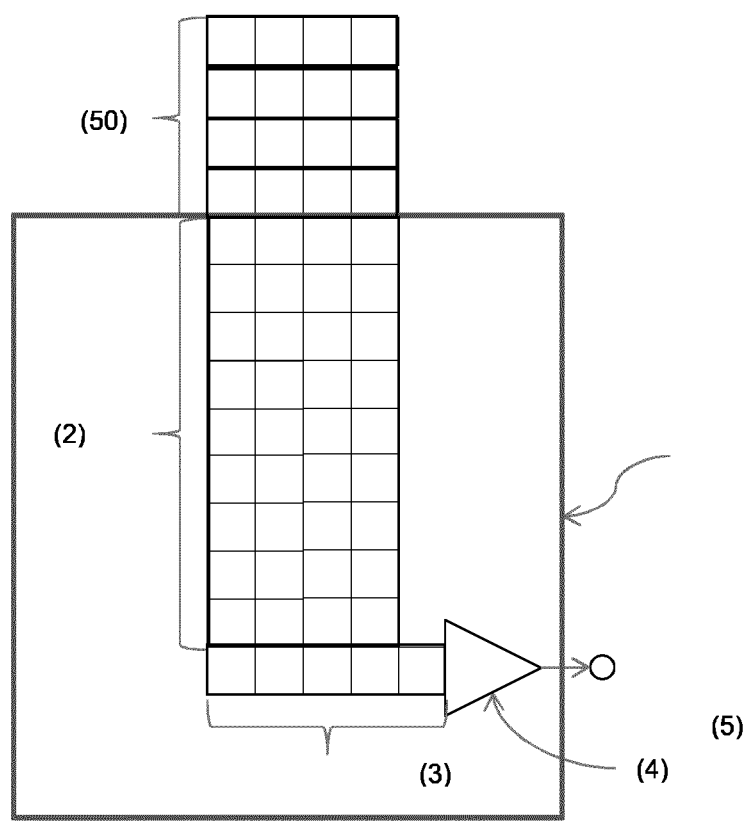
FIG. 16 illustrates a further example of a time of flight sensor having a two-dimensional image region.
Figure 17:
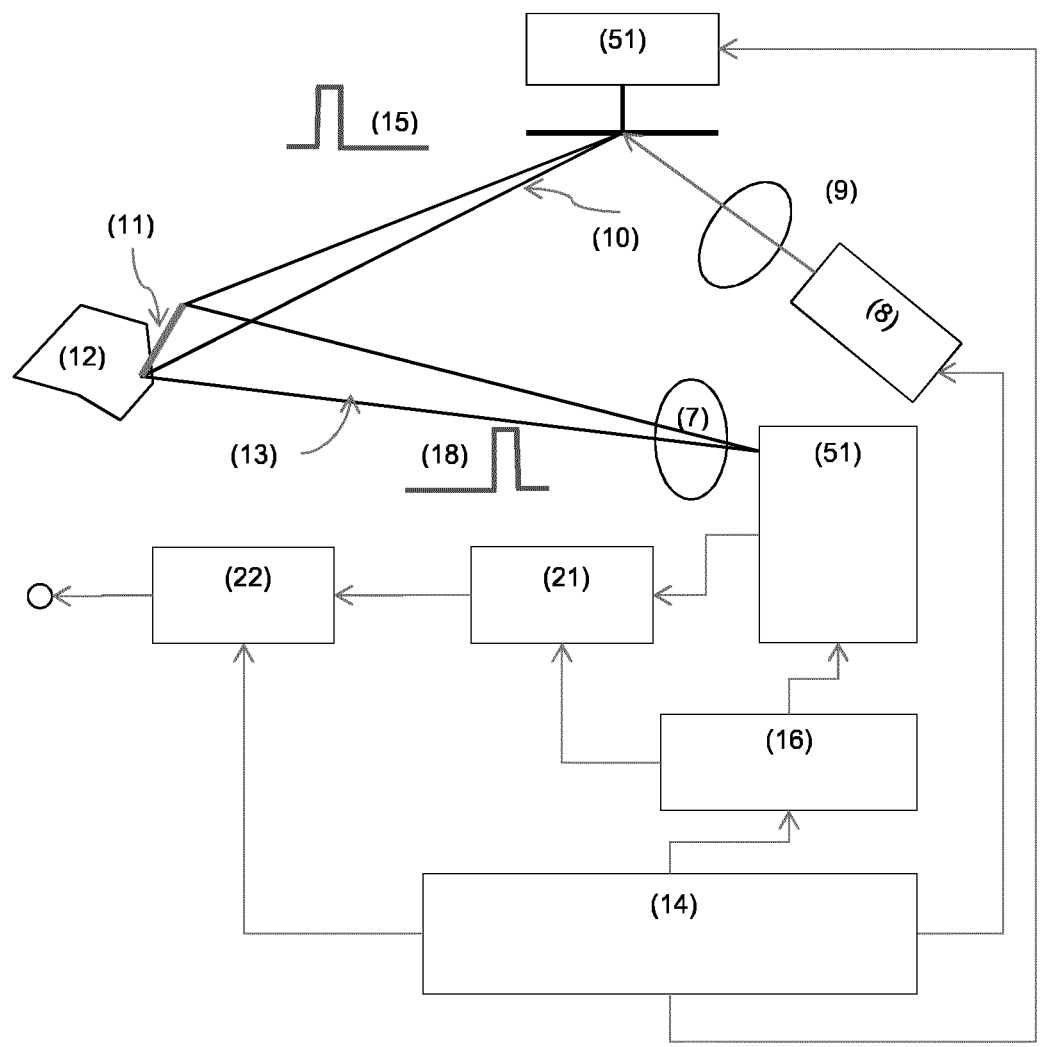
FIG. 17 illustrates a time of flight distance measurement system using the time of flight sensor of FIG. 16.

This can be achieved without scanning the whole transmitter/receiver by extending the image section of the time of flight sensor (50) as shown in FIG. 16 and modifying the system as illustrated in FIG. 17 so that the laser's fan beam (10) is controlled by a steering element (51) such as a mirror controlled by control circuit (14) to illuminate the remote object (12) with a stripe of laser light.

FIG. 16 shows that the time of flight sensor (50) has an array of sensors with both rows and columns feeding into the storage region (2)

The steering element may either be a galvanometer scanned mirror, a rotating polygon or preferably a micro electro-mechanical (MEMs) system. Alternatively, the steering element may be an optical phased array (OPA) or controllable diffraction elements.

The image of the illuminated stripe is focussed onto the image section of the area time of flight sensor (50) and the control circuit (14) controls the operation of the beam steerer so as to sequentially move the illuminated stripe across the far object in such a way as to step the corresponding image of the stripe from row to row of the image section (50) of the time of flight Sensor.

The control sensor then operates the time of flight sensor in the usual way, but adjusts the number of frame transfer cycles applied so that the relationship between the temporal sampling of the captured time of flight signal and the position of the associated charge packets in the store section at the end of the frame transfer is fixed.

By way of example, let R be the index of a row in the sensor's image section that is capturing the reflected signal from the illuminated stripe of a flat plane, perpendicular to the field of view of the sensor. If R=0, then the time of flight sensor would operate as shown in FIG. 3, where the reflected pulse is captured by the bottom row of the image section after r frame transfer clock cycles where $$r = \text{Time of flight} * Ft$$

and after N cycles the frame transfer is complete and the charge packet generated by the reflected pulse is r rows up from the readout/store section boundary.

However, if the control circuit causes the beam steerer to move the illuminated stripe such that its image is focused on the third row of the time of flight sensor's image section (i.e. R=3) then, because the object is a flat plane, the reflected pulse is still captured after r transfer clock cycles but, because the signal has been captured from three rows higher in the image section, the control circuit must add three additional cycles to the number of transfer cycles to bring the captured signal into the same position relative to the readout/store section boundary as the R=0 case.

The captured signal in the store section is then readout in the same way as the linear sensor but the control circuit's knowledge of which row of the sensor the linear array of distance data was captured from allows a full 3D map of the remote object to be generated.

Figure 18:
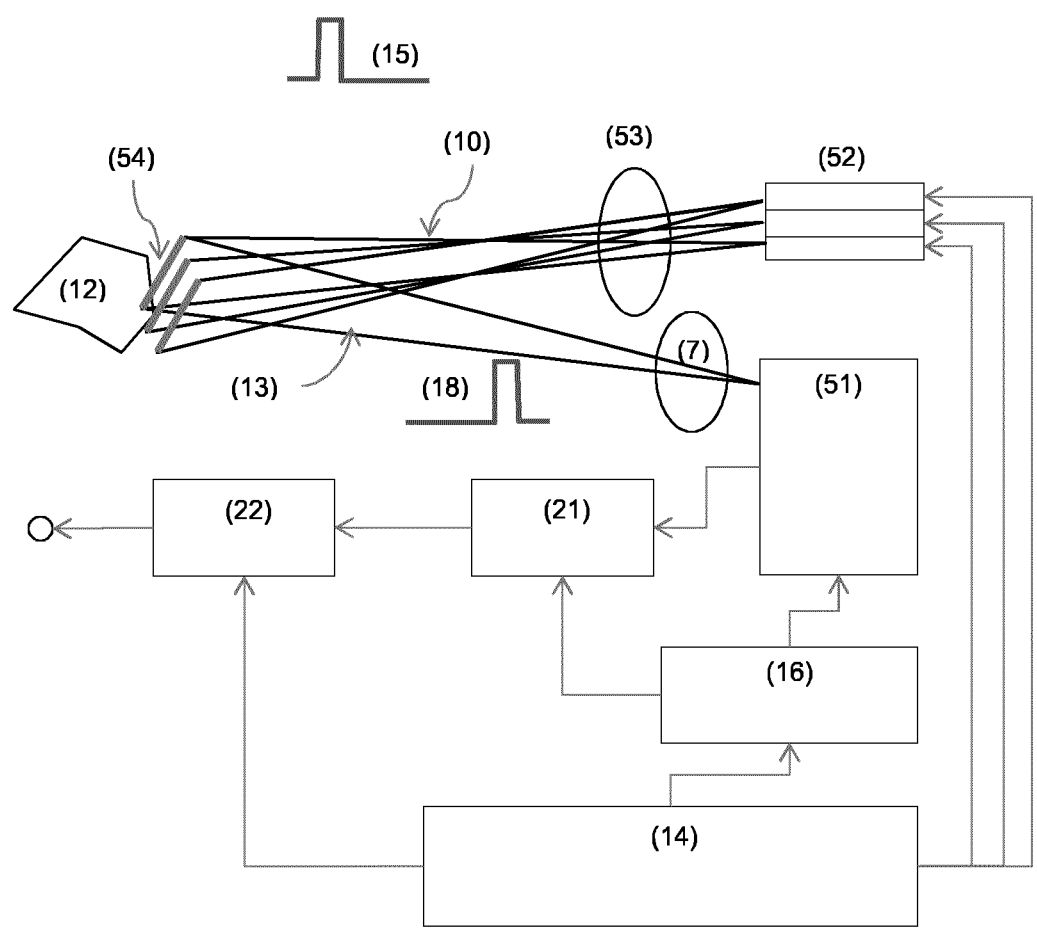
FIG. 18 illustrates a further example of a time of flight sensor having a two-dimensional image region.

The need for mechanical scanning (the steering element) can be eliminated as shown in FIG. 18 by replacing the light source with multiple light sources (52) and an optical system (53) that focuses the light from each of the multiple light sources (52) to create a separate stripe of illumination (54) on the remote object where the image created on the focal plane of the time of flight sensor (51) by an individual stripe is aligned an individual row of the time of flight sensor.

Control circuit (14) controls the operation of the multiple emitters (52) and time of flight sensor so that each emitter is switched on sequentially and the time of flight sensor captures the time of flight data from each stripe illuminated by each individual light source. In this way the time of fight and hence 2D distance profile of each illuminated stripe is captured allowing a 3D map of the remote object to be generated.

Those skilled in the art will realise that the above embodiments are by way of example only and variations may be made.

For example, although the above description describes separate components some or all of the components may be integrated onto a monolithic integrated circuit, multi-chip module or other single packaged device.

The invention claimed is:

1. A time of flight distance measurement system, comprising:
   a light emitter (8) configured to emit a pulse of light toward an object;
   a time of flight sensor (6) comprising:
      a photosensitive image region (1, 50) comprising an array of M by P pixels, where P is a positive integer, arranged to respond to incident light on the photosensitive image region (1), wherein the incident light on the photosensitive image region comprises a reflected pulse, being light of the emitted pulse that has been reflected from the object, wherein the reflected pulse arrives after a time of flight;
      a storage region (2) arranged not to respond to the incident light, the storage region comprising M columns of N storage elements defining N rows of M storage elements, each column of N storage elements being arranged to transfer data from a respective one of the M pixels along the column from one storage element to the next at a transfer frequency Ft, each row of M storage elements storing data captured at the same time, wherein a charge packet generated by the reflected pulse in one of the pixels is transferred to the storage region after r clock cycles, where r=Time of flight*Ft; and
      a readout section (3) arranged to read out data from the M columns of the storage region at a readout frequency Fr; and
   circuitry (16) for controlling the time of flight sensor (6) to capture image data in the image section and to transfer the captured image data along the columns at the transfer frequency Ft and then to readout the captured image data at the readout frequency Fr different to the transfer frequency.

2. The time of flight distance measurement system according to claim 1, wherein the readout section is arranged to read out data of one of the rows of storage elements in parallel.

3. The time of flight distance measurement system according to claim 2, wherein the time of flight sensor (8) further comprises an electron multiplication register section (60) between the output of the storage region (2) and a row of output circuits (36) to deliver an electron multiplication gain G to the pixels of each of the rows of M storage elements in parallel.

4. The time of flight distance measurement system according to claim 1, wherein the array of M by P pixels is a two dimensional array (50) with both M and P greater than 1, the time of flight distance measurement system further comprising a steering element (51) arranged to steer the light emitted by the light emitter.

5. The time of flight distance measurement system according to claim 4, wherein the circuitry for controlling the time of flight sensor is arranged to direct the steering element (51) to direct the light across an object to be detected such that the stripe is stepped from row to row of the array of image pixels.

6. The time of flight distance measurement system according to claim 1, wherein the array of M by P pixels is a two dimensional array (50) with both M and P greater than 1, and wherein the light emitter (8) comprises a multiple light source having a plurality of individual light sources (52) and an optical system (53) arranged to create a separate stripe of illumination (54) from each individual light source (55) across an object to be detected arranged such that the image from each individual light source (52) is incident on a separate row of the two-dimensional array of M by P pixels.

7. The time of flight distance measurement system according to claim 1 wherein the photosensitive image region comprises a linear array of M pixels with P=1.

8. The time of flight distance measurement system according to claim 1, wherein the time of flight sensor (6) further comprises an electron multiplication register (24) for delivering an electron multiplication gain G, the electron multiplication register (24) being connected between the readout section (3) and an output amplifier (4).

9. The time of flight distance measurement system according to claim 8, further comprising circuitry for adjusting the electron multiplication gain G dependent on which of the rows of M storage elements is being read out.

10. The time of flight distance measurement system according to claim 1, further comprising circuitry for adjusting the readout frequency dependent on which of the rows of M storage elements is being read out.

11. The time of flight distance measurement system according to claim 1 wherein the time of flight sensor (8) further comprises an anti-blooming electrode gate (41) separating the M elements of the image section (1) from a drain structure (42).

12. The time of flight distance measurement system according to claim 11 further comprising circuitry (43) arranged to reduce the anti-blooming voltage applied to the anti-blooming gate electrode (41) in synchronism with the transfer of data along the columns of the storage region.

13. The time of flight distance measurement system according to claim 11 further comprising circuitry (43) arranged to supply a range gating voltage followed by a higher anti-blooming voltage to the anti-blooming electron gate, the range gating voltage being a low voltage such that the potential barrier between the image section elements and the drain structure is removed to clear charges from the image section (1), and the higher anti-blooming voltage being a voltage applied during capture of the image.

14. The time of flight distance measurement system according to claim 1, in which the circuitry is adapted to capture plural measurements by emitting a laser pulse from the light emitter and capturing the image at the photosensitive image sensor with a delay,
wherein the delay time between emitting the laser pulse and capturing the image at the photosensitive image device is incremented over the plural measurements in time steps within a single period, the single period being the inverse of the transfer frequency Ft.

15. The time of flight distance measurement system according to claim 1, further comprising an optical shield (5) shielding the storage region and leaving the photosensitive image region exposed.

16. The time of flight distance measurement system according to claim 15, wherein the photosensitive image region and the storage section comprise elements of an M by (N+1) array of charge coupled elements, the optical shield (5) shielding all but one row of M charge coupled elements, the said one row constituting the photosensitive image region (1) and the N rows of the charge coupled elements constituting the storage region (2).

17. The time of flight distance measurement system according to claim 1 further comprising an additional store section (45) for integrating light captured from multiple pulses, the additional store section (45) comprising at least one additional storage element connected to each of the M elements of the image section (1).

18. The time of flight distance measurement system according to claim 1, wherein the image region (1, 50) and storage region (2) comprise a plurality of electrodes, the time of flight sensor further comprising a plurality of straps for providing a connection to the electrodes.

19. A time of flight sensor (6) for use in a time of flight distance measurement system, the time of flight sensor comprising:
a photosensitive image region (1) comprising an array of M by P pixels, where P is a positive integer, arranged to respond to incident light on the photosensitive image region (1), wherein the incident light on the photosensitive image region comprises a reflected pulse, being light that has been reflected from the object, wherein the reflected pulse arrives after a time of flight;
a storage region (2) arranged not to respond to the incident light, the storage region comprising M columns of N storage elements defining N rows of M storage elements, each column of N storage elements being arranged to transfer data from a respective one of the M pixels along the column from one storage element to the next at a transfer frequency Ft, each row of M storage elements storing data captured at the same time, wherein a charge packet generated by the reflected pulse in one of the pixels is transferred to the storage region after r clock cycles, where r=Time of flight*Ft; and
a readout section (3) arranged to read out data from the M columns of the storage region at a readout frequency Fr.

20. A method of operating a time of flight distance measurement system comprising:
emitting a pulse of light toward an object;
capturing an image on the pixels of a photosensitive image region of a time of flight sensor, the photosensitive image region having an array of M by P pixels, where P is a positive integer, arranged to respond to incident light on the photosensitive image region, wherein the incident light on the photosensitive image region comprises a reflected pulse, being light of the emitted pulse that has been reflected from the object, wherein the reflected pulse arrives after a time of flight;
storing in a storage region of a time of flight sensor image data captured by the photosensitive image region, the storage region arranged not to respond to the incident light, the storage region having M columns of N storage elements defining N rows of M storage elements, each column of N storage elements being arranged to transfer data from a respective one of the M pixels along the column from one storage element to the next at a transfer frequency Ft, each row of M storage elements storing data captured at a same time, wherein a charge packet generated by the reflected pulse in one of the pixels is transferred to the storage region after r clock cycles, where r=Time of flight*Ft
repeatedly and synchronously transferring the image on the M pixels of the photosensitive image region along the M columns of the storage region at the transfer frequency Ft and capturing a new image on the M pixels of the photosensitive image region at the transfer frequency Ft; and
reading out the captured pixels from the M columns of the storage region through the readout section at the readout frequency Fr, wherein Fr≠Ft.

* * * * *